United States Patent
Otake

(10) Patent No.: US 8,515,632 B2
(45) Date of Patent: Aug. 20, 2013

(54) DRIVING FORCE CONTROLLER FOR VEHICLE

(75) Inventor: Hirotada Otake, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 857 days.

(21) Appl. No.: 12/375,687

(22) PCT Filed: Jul. 31, 2007

(86) PCT No.: PCT/JP2007/065330
§ 371 (c)(1),
(2), (4) Date: Jan. 30, 2009

(87) PCT Pub. No.: WO2008/016168
PCT Pub. Date: Feb. 7, 2008

(65) Prior Publication Data
US 2010/0004832 A1    Jan. 7, 2010

(30) Foreign Application Priority Data

Jul. 31, 2006   (JP) ................. 2006-207781
Jul. 31, 2006   (JP) ................. 2006-207784

(51) Int. Cl.
*G06F 17/00*    (2006.01)
(52) U.S. Cl.
USPC .......................................................... 701/54
(58) Field of Classification Search
USPC .......................................................... 701/54
See application file for complete search history.

(56) References Cited

U.S. PATENT DOCUMENTS 4,971,164 A * 11/1990 Fujita et al. ............ 180/197
5,282,137 A    1/1994 Suzuki et al.

(Continued)

FOREIGN PATENT DOCUMENTS

JP    2 252930    10/1990
JP    5 86919     4/1993

(Continued)

OTHER PUBLICATIONS

Extended European Search Report issued Nov. 5, 2010, in Patent Application No. 07792003.1.

*Primary Examiner* — James Trammell
*Assistant Examiner* — Jerrah Edwards
(74) *Attorney, Agent, or Firm* — Oblon, Spivak, McClelland, Maier & Neustadt, L.L.P.

(57) ABSTRACT

An object of the present invention is to effectively reduce driving force of a vehicle, when the driving force of the vehicle must be reduced, while avoiding an increase in the temperature of exhaust gas and resultant deterioration of an exhaust gas purification catalyst, the object being achieved by effectively utilizing delaying of the ignition timing or reduction of the fuel supply amount to a possible extent, while preventing elongation of the execution time of control of delaying the ignition timing or control of reducing the fuel supply amount. When the driving force of the vehicle is excessively large, a target driving force Fxt is computed. When an indicator value SAa indicating the degree of necessity of reducing the driving force is equal to or greater than a first reference value SAa1, the throttle opening is reduced so that the driving force of the vehicle decreases more slowly than the target driving force Fxt. When the indicator value SAa is equal to or greater than a second reference value SAa2 greater than the first reference value SAa1, in addition to the reduction of the throttle opening, the ignition timing is delayed so that the driving force of the vehicle decreases faster than does in the case where only the reduction of the throttle opening is performed.

19 Claims, 13 Drawing Sheets

(56) References Cited

U.S. PATENT DOCUMENTS 5,732,380 A * 3/1998 Iwata ................... 701/85
5,868,474 A    2/1999 Abe et al.
6,412,886 B1   7/2002 Abe et al.

FOREIGN PATENT DOCUMENTS

| JP | 5 125970   | 5/1993  |
| JP | 5 178189   | 7/1993  |
| JP | 7 84850    | 9/1995  |
| JP | 7 259593   | 10/1995 |
| JP | 7 324641   | 12/1995 |
| JP | 2524246    | 5/1996  |
| JP | 10 264801  | 10/1998 |
| JP | 11 263152  | 9/1999  |
| JP | 2002 266665| 9/2002  |
| JP | 2004 183615| 7/2004  |

* cited by examiner

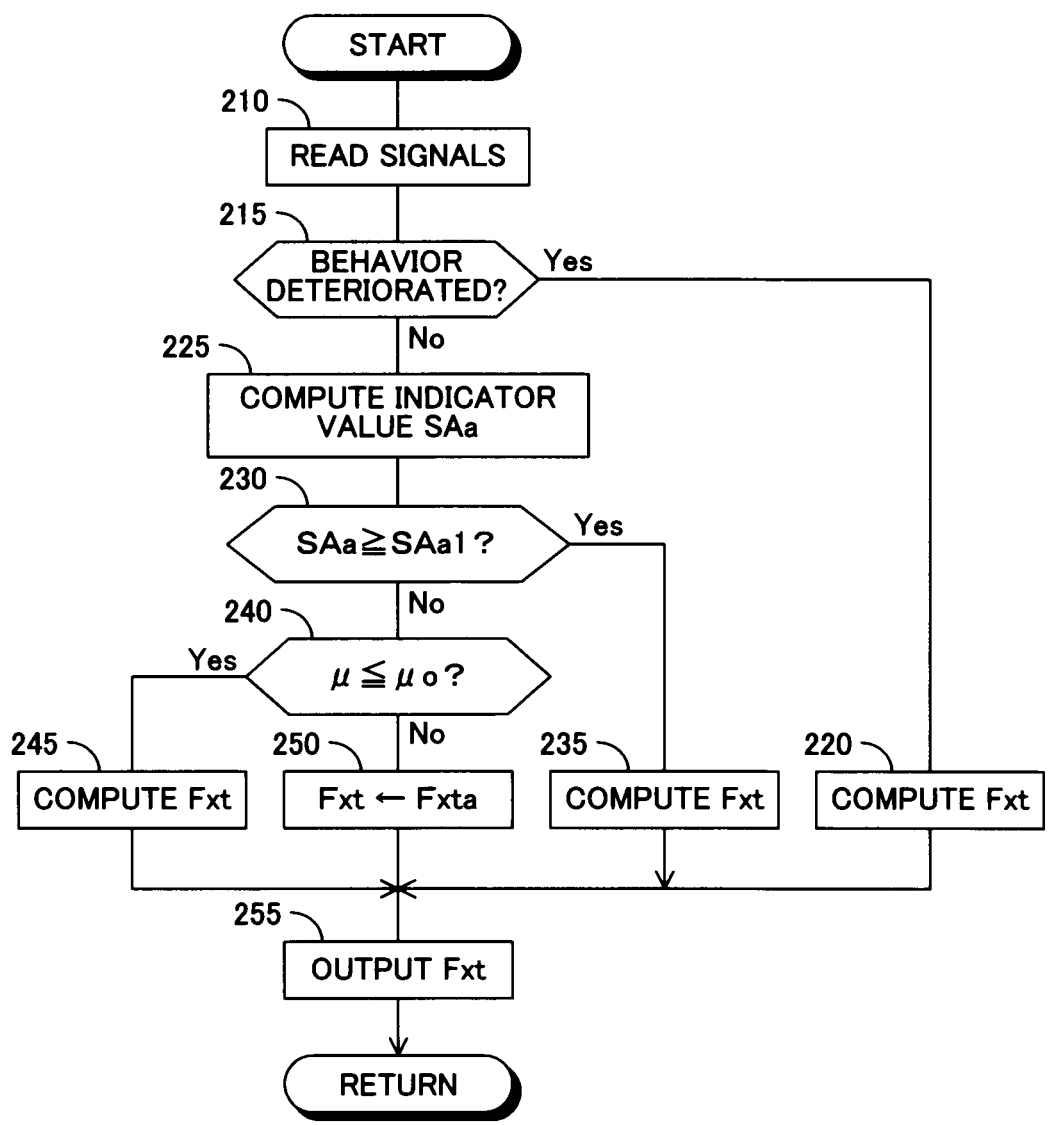

DRIVING FORCE CONTROLLER FOR VEHICLE

TECHNICAL FIELD

The present invention relates to a driving force controller for a vehicle, and more particularly, to a driving force controller which controls driving force of the vehicle through control of throttle opening of an engine and control of ignition timing.

BACKGROUND ART

For example, Japanese Patent Publication (kokoku) No. H7-84850 discloses a known driving force controller for a vehicle, such as an automobile, in which a spark ignition engine is mounted, the driving force controller controlling driving force of the vehicle through control of throttle opening of the engine and control of ignition timing. When drive slippages of drive wheels increase, the driving force controller lowers the output of the engine through control of fully closing the throttle valve and control of delaying the ignition timing, to thereby reduce the driving force of the vehicle. When the drive slippages of drive wheels decrease, the driving force controller first stops the control of delaying the ignition timing, and then stops the control of fully closing the throttle valve.

When the ignition timing is delayed in control of the spark ignition engine, the output of the engine can be reduced with good responsiveness, whereby the driving force of the vehicle can be reduced with good responsiveness. However, when the ignition timing is delayed, the temperature of exhaust gas of the engine increases, which causes deterioration of an exhaust gas purification catalyst. Therefore, the ignition timing cannot be delayed continuously, and a period over which the control for delaying the ignition timing is performed is restricted to a short period of time.

In contrast, when the output of the engine is reduced through the control of completely closing the throttle valve, the temperature of exhaust gas of the engine does not increase, and, thus, deterioration of the exhaust gas purification catalyst does not occur. Therefore, the control of completely closing the throttle valve can be performed continuously. However, the control of completely closing the throttle valve cannot reduce the output of the engine with good responsiveness, and, thus, cannot reduce the driving force of the vehicle with good responsiveness.

However, the driving force controller disclosed in the above-described Japanese Patent Publication No. H7-84850 does not take into consideration the execution time of the ignition-timing delay control, and may cause an increase in the temperature of exhaust gas of the engine and resultant deterioration of the exhaust gas purification catalyst. Therefore, the driving force controller disclosed in Japanese Patent Publication No. H7-84850 has a problem of being unable to clear strict emission control standards enacted in recent years.

Japanese Patent Application Laid-Open (kokai) No. H10-264801 discloses a driving force controller in which the execution time of the ignition-timing delay control is restricted. However, since execution of the ignition-timing delay control is restricted to a predetermined period of time which starts from a point in time when reduction of the engine output through control of reducing the throttle opening is started, the execution time of the ignition-timing delay control must be restricted to a very short time in order to prevent an increase in the temperature of exhaust gas of the engine in all travel conditions of the vehicle. Accordingly, the driving force controller has a problem that the effect of reducing the vehicle driving force through the ignition-timing delay control is limited. Such a problem arises, for example, in the case where drive slippages of the drive wheels occur immediately after the vehicle has started to move, the throttle-opening reduction control and the ignition-timing delay control are started in order to cope with the drive slippages, and the ignition-timing delay control is ended after elapse of a predetermined time. In such a case, even when drive slippages of the drive wheels continuously occur after that point in time, the ignition-timing delay control cannot be executed, and the drive slippages cannot be effectively reduced by means of reducing the engine output through the ignition-timing delay control.

Further, as in the case of the ignition-timing delay control, through reduction of the amount of fuel supplied to the engine, the output of the engine can be reduced with higher responsiveness as compared with the case of the throttle-opening reduction control. However, when the amount of fuel supplied to the engine is reduced, as in the case of the ignition-timing delay control, the temperature of exhaust gas of the engine increases, which causes deterioration of the exhaust gas purification catalyst. Accordingly, the execution time of the control of reducing of the fuel supply amount must be restricted to a very short time.

DISCLOSURE OF THE INVENTION

A main object of the present invention is to effectively reduce driving force of a vehicle, in a state where the driving force of the vehicle must be reduced, while avoiding an increase in the temperature of exhaust gas of an engine and resultant deterioration of an exhaust gas purification catalyst, the object being achieved by effectively utilizing delaying of the ignition timing or reduction of the fuel supply amount to a possible extent, while preventing elongation of the execution time of control of delaying the ignition timing or control of reducing the fuel supply amount.

The present invention provides a driving force controller for a vehicle comprising throttle-opening control means for controlling a throttle opening of an engine on the basis of at least an amount of drive operation by a driver; engine-output reduction means for reducing an output of the engine through delaying of ignition timing of the engine or reduction of an amount of fuel supplied to the engine; and driving-force reduction control means for determining the degree of necessity of reducing a driving force of the vehicle on the basis of travel conditions of the vehicle and for reducing the output of the engine by controlling at least the throttle-opening control means when the degree of necessity is high, the driving force controller being characterized in that, when the degree of necessity is equal to or higher than a first reference value, the driving-force reduction control means reduces the throttle opening controlled by the throttle-opening control means, and, when the degree of necessity is equal to or higher than a second reference value greater than the first reference value, the driving-force reduction control means reduces the output of the engine by the engine-output reduction means as well as reducing the throttle opening controlled by the throttle-opening control means.

By virtue of this configuration, the degree of necessity of reducing the driving force of the vehicle is determined on the basis of the travel conditions of the vehicle. When the degree of necessity is equal to or higher than the first reference value, the throttle opening controlled by the throttle control means is reduced. When the degree of necessity is equal to or higher than the second reference value greater than the first reference value, the output of the engine is reduced by the engine-output reduction means, in addition to the reduction of the throttle opening controlled by the throttle-opening control means. Therefore, the reduction of the engine output by the engine-output reduction means can be performed only in a situation where the degree of necessity of reducing the driving force of the vehicle is equal to or higher than the second reference value and very high.

Accordingly, when the degree of necessity of reducing the driving force of the vehicle is not less than the first reference value but less than the second reference value, the reduction of the engine output by the engine-output reduction means is prevented, whereby an increase in the temperature of exhaust gas of the engine and resultant deterioration of an exhaust gas purification catalyst can be prevented. Further, in a situation where the degree of necessity of reducing the driving force of the vehicle is equal to or higher than the second reference value and very high, the output of the engine can be reliably and effectively reduced by the engine output reduction means as well as through reduction of the throttle opening, whereby the driving force of the vehicle can be reduced effectively without fail.

Notably, when the degree of necessity of reducing the driving force of the vehicle is equal to or higher than the second reference value, the engine output is reduced by two means; i.e., through reduction of the throttle opening and through reduction of the engine output effected by the engine output reduction means, whereby the driving force of the vehicle is efficiently reduced. Therefore, the degree of necessity of reducing the driving force of the vehicle quickly drops, to thereby prevent excessive elongation of a time over which the reduction of the engine output by the engine output reduction means is performed.

In the above-described configuration, the driving force controller may comprise means for computing a first target driving force of the vehicle on the basis of the amount of drive operation by the driver and the travel condition of the vehicle, wherein the driving-force reduction control means calculates, on the basis of two values of the first target driving force computed before and after a point in time when the degree of necessity becomes equal to or greater than the first reference value, a second target driving force which decreases more slowly than a decrease of the first target driving force between the two values and which is to be achieved through control of the throttle-opening control means and a third target driving force which decreases more slowly than the decrease of the first target driving force between the two values and faster than the second target driving force and which is to be achieved through control of the throttle-opening control means and the engine-output reduction means; and the driving-force reduction control means reduces the output of the engine by the engine-output reduction means when the degree of necessity is equal to or greater than the second reference value and a deviation between the second target driving force and the third target driving force is equal to or greater than a deviation determination reference value.

By virtue of this configuration, a second target driving force and a third target driving force are computed on the basis of two values of the first target driving force computed before and after a point in time when the degree of necessity of reducing the driving force becomes equal to or greater than the first reference value. The second target driving force, which decreases more slowly than the decrease of the first target driving force between the two values, is achieved through control of the throttle-opening control means. The third target driving force, which decreases more slowly than the decrease of the first target driving force between the two values and faster than the second target driving force, is achieved through control of the throttle-opening control means and the engine-output reduction means. The output of the engine is reduced by the engine-output reduction means when the degree of necessity is equal to or greater than the second reference value and a deviation between the second target driving force and the third target driving force is equal to or greater than a deviation determination reference value.

Accordingly, when the first target driving force of the vehicle decreases by a large amount, the degree of necessity is equal to or higher than the second reference value, and the deviation between the second target driving force and the third target driving force is equal to or greater than the deviation determination reference value, the output of the engine can be reliably and effectively reduced through reduction of the throttle opening and through reduction of the engine output by the engine output reduction means. When the degree of necessity is equal to or higher than the second reference value but the deviation between the second target driving force and the third target driving force is less than the deviation determination reference value, the reduction of the engine output by the engine output reduction means is prevented, and only the reduction of the engine output through reduction of the throttle opening is performed, thereby reliably prevent an increase in the temperature of exhaust gas of the engine and resultant deterioration of the exhaust gas purification catalyst, which would otherwise occur due to reduction of the engine output by the engine output reduction means.

In general, when the output of the engine is reduced by means of delaying the ignition timing, the output of the engine drops sharply, as compared with the case where the opening of the throttle valve is reduced, whereby a driving force transmitted from the engine to the drive wheels via a drive system also drops sharply. Therefore, depending on the travel condition of the vehicle, a rotational vibration is generated in the drive wheels, or the state of the rotational vibration of the drive wheels may become worse.

Accordingly, in the above-described configuration, the driving-force reduction means may comprise rotational-vibration-state determination means for determining whether or not a rotational vibration state of the drive wheels possibly becomes worse due to reduction of the output of the engine by the engine output reduction means; and prohibition means for prohibiting the reduction of the output of the engine by the engine output reduction means when the rotational-vibration-state determination means determines that the rotational vibration state of the drive wheels possibly becomes worse, despite the degree of necessity being equal to or greater than the second reference value.

By virtue of this configuration, even in the case where the degree of necessity is equal to or greater than the second reference value, when the rotational-vibration-state determination means determines that the rotational vibration state of the drive wheels possibly becomes worse, the reduction of the output of the engine by the engine output reduction means is prohibited. Therefore, the reduction of the output of the engine by the engine output reduction means can be reliably prevented when the rotational vibration state of the drive wheels possibly becomes worse due to the reduction of the output of the engine by the engine output reduction means.

Accordingly, when the degree of necessity of reducing the driving force of the vehicle is not less than the first reference value but less than the second reference value, the reduction of the engine output by the engine-output reduction means is prevented, whereby an increase in the temperature of exhaust gas of the engine and resultant deterioration of the exhaust gas purification catalyst can be prevented. Further, in a situation where the degree of necessity of reducing the driving force of the vehicle is equal to or higher than the second reference value and very high, the output of the engine can be reliably and effectively reduced by the engine output reduction means as well as through reduction of the throttle opening, whereby the driving force of the vehicle can be reduced effectively without fail. In addition, it is possible to reliably prevent the rotational vibration state of the drive wheels from becoming worse due to the reduction of the engine output by the engine output reduction means.

In general, the phenomenon that the rotational vibration state of the drive wheels becomes worse upon reduction of the engine output by the engine output reduction means becomes remarkable in the case where a certain rotational vibration has already been generated in the drive wheels or in the case where a large difference exists between friction coefficients of road surfaces which the left and right wheels face. Therefore, it is possible to determine whether or not the rotational vibration state of the drive wheels possibly becomes worse by determining whether or not a certain rotational vibration has already been generated in the drive wheels or determining whether or not a large difference exists between friction coefficients of road surfaces which the left and right wheels face.

Accordingly, in the above-described embodiment, the rotational-vibration-state determination means may include means for detecting a rotational vibration of the drive wheels, and be configured such that, when the degree of the rotational vibration of the drive wheels is equal to or greater than a reference value for rotational vibration determination, the rotational-vibration-state determination means determines that the rotational vibration state of the drive wheels possibly becomes worse. Alternatively, the rotational-vibration-state determination means may include means for detecting friction coefficients of road surfaces which the left and right drive wheels face, and be configured such that, when the difference between the friction coefficients of the road surfaces which the left and right drive wheels face is equal to or greater than a reference value for split-µ road determination, the rotational-vibration-state determination means determines that the rotational vibration state of the drive wheels possibly becomes worse.

By virtue of these configurations, when the degree of the rotational vibration of the drive wheels is equal to or greater than the reference value for rotational vibration determination, the rotational vibration state of the drive wheels is determined to possibly become worse. Alternatively, when the difference between the friction coefficients of the road surfaces which the left and right wheels face is equal to or greater than the reference value for split-µ road surface, the rotational vibration state of the drive wheels is determined to possibly become worse. Therefore, it is possible to reliably determine whether or not the rotational vibration state of the drive wheels becomes worse due to the reduction of the engine output by the engine output reduction means.

In the above-described configuration, the driving force controller may comprise means for computing a first target driving force of the vehicle on the basis of the amount of drive operation by the driver and the travel condition of the vehicle, wherein the driving-force reduction control means calculates, on the basis of two values of the first target driving force computed before and after a point in time when the degree of necessity becomes equal to or greater than the first reference value, a second target driving force which decreases more slowly than a decrease of the first target driving force between the two values and which is to be achieved through control of the throttle-opening control means and a third target driving force which decreases more slowly than the decrease of the first target driving force between the two values and faster than the second target driving force and which is to be achieved through control of the throttle-opening control means and the engine-output reduction means; and the driving-force reduction control means reduces the output of the engine by the engine-output reduction means when the degree of necessity is equal to or greater than the second reference value and a deviation between the second target driving force and the third target driving force is equal to or greater than a deviation determination reference value. Further, in this case, the prohibition means is configured such that, even when the degree of necessity is equal to or greater than the second reference value and the deviation between the second target driving force and the third target driving force is equal to or greater than the deviation determination reference value, the prohibition means prohibits the reduction of the output of the engine by the engine output reduction means when the rotational-vibration-state determination means determines that the rotational vibration state of the drive wheels possibly becomes worse.

By virtue of this configuration, even in the case where the degree of necessity is equal to or greater than the second reference value and the deviation between the second target driving force to be achieved through control of the throttle-opening control means and the third target driving force to be achieved through control of the throttle-opening control means and the engine-output reduction means is equal to or greater than the deviation determination reference value, the reduction of the output of the engine by the engine output reduction means is prohibited if the rotational-vibration-state determination means determines that the rotational vibration state of the drive wheels possibly becomes worse. Therefore, even in the case where the reduction of the output of the engine by the engine output reduction means is needed, when the rotational vibration state of the drive wheels possibly becomes worse, it is possible to reliably prevent the output of the engine from being reduced by the engine output reduction means and to prevent the rotational vibration state of the drive wheels from becoming worse due to the reduction of the engine output.

In the above-described configuration, the deviation determination reference value may be variably set in accordance with rotational speed of the engine such that, when the rotational speed of the engine is low, the deviation determination reference value becomes small, as compared with the case where the rotational speed of the engine is high.

In general, when the rotational speed of the engine is low, the flow velocity of air, a gas mixture, or the like within the engine decreases, as compared with the case where the rotational speed of the engine is high, to thereby decrease the speed at which the engine output decreases in response to reduction of the throttle opening. Therefore, in order to effectively reduce the engine output, when the rotational speed of the engine is low, the necessity of reducing the engine output by the engine output reduction means is higher, as compared with the case where the rotational speed of the engine is high.

By virtue of the above-described configuration, the deviation determination reference value is variably set in accordance with the rotational speed of the engine such that, when the rotational speed of the engine is low, the deviation determination reference value becomes small, as compared with the case where the rotational speed of the engine is high. Therefore, when the rotational speed of the engine is low, the deviation between the second and third target driving forces can be more easily determined to be equal to or greater than the deviation determination reference value, as compared with the case where the rotational speed of the engine is high, whereby the reduction of the engine output by the engine output reduction means occurs more easily.

In the above-described configuration, the driving-force reduction control means may be configured such that, when the degree of necessity is equal to or greater than the second reference value and the rotational speed of the engine is equal to or less than a reference value for engine rotational speed determination, the output of the engine is reduced by the engine output reduction means.

By virtue of the above-described configuration, the rate of decrease of the second target driving force to be achieved through control of the throttle-opening control means is variably set in accordance with the rotational speed of the engine such that, when the rotational speed of the engine is low, the rate of decrease becomes small, as compared with the case where the rotational speed of the engine is high. Therefore, when the rotational speed of the engine is low, the deviation between the second and third target driving forces can be increased, so that the deviation between the second and third target driving forces can be more easily determined to be equal to or greater than the deviation determination reference value, as compared with the case where the rotational speed of the engine is high, whereby the reduction of the engine output by the engine output reduction means occurs more easily.

In the above-described configuration, the throttle-opening control means may be configured to control the throttle opening on the basis of the second target driving force to be achieved through control of the throttle-opening control means.

By virtue of this configuration, since the throttle opening is controlled on the basis of the second target driving force to be achieved through control of the throttle-opening control means, the throttle opening can be reduced in accordance with the decrease of the second target driving force to be achieved through control of the throttle-opening control means.

In the above-described configuration, the engine output reduction means may be configured to reduce the output of the engine on the basis of the deviation between the second target driving force to be achieved through control of the throttle-opening control means and the third target driving force to be achieved through control of the throttle-opening control means and the engine-output reduction mean.

By virtue of this configuration, the output of the engine is reduced on the basis of the deviation between the second target driving force to be achieved through control of the throttle-opening control means and the third target driving force to be achieved through control of the throttle-opening control means and the engine-output reduction means. Therefore, the throttle opening can be reduced in accordance with the decrease of the second target driving force to be achieved through control of the throttle control means, and additionally, the engine output can be reduced in accordance with the decrease of the target driving force to be achieved through control of the engine output reduction means.

In the above-described configuration, the driving-force reduction control means may be configured such that, when the degree of necessity is equal to and greater than the second reference value and the rotational speed of the engine is equal to or less than a reference value for engine rotational speed determination, the output of the engine is reduced by the engine output reduction means.

As described above, when the rotational speed of the engine is low, the flow velocity of air, a gas mixture, or the like within the engine decreases, as compared with the case where the rotational speed of the engine is high, to thereby decrease the speed at which the engine output decreases in response to reduction of the throttle opening. Therefore, in order to effectively reduce the engine output, preferably, the output of the engine is reliably reduced by the engine output reduction means when the rotational speed of the engine is low.

By virtue of the above-described configuration, when the degree of necessity is equal to and greater than the second reference value and the rotational speed of the engine is equal to or less than the reference value for engine rotational speed determination, the output of the engine is reduced by the engine output reduction means. Therefore, when the rotational speed of the engine is low, the engine output can be reliably reduced by the engine output reduction means. Further, when the rotational speed of the engine is equal to or less than the reference value for engine rotational speed determination in a situation where the degree of necessity is equal to and greater than the second reference value, the reduction of the engine output by the engine output reduction means is immediately started. Therefore, as compared with the case of the above-described configuration of claim 2 or 6, the reduction of the engine output by the engine output reduction means can be started earlier, whereby the driving force of the vehicle can be reduced earlier.

In the above-described configuration, the driving-force reduction control means may be configured to reduce the output of the engine by the engine output reduction means when the degree of necessity is equal to and greater than the second reference value and the rotational speed of the engine is equal to or less than the reference value for engine rotational speed determination, wherein the prohibition means is configured such that, even when the degree of necessity is equal to or greater than the second reference value and the rotational speed of the engine is equal to or less than the reference value for engine rotational speed determination, the prohibition means prohibits the reduction of the output of the engine by the engine output reduction means when the rotational-vibration-state determination means determines that the rotational vibration state of the drive wheels possibly becomes worse.

As described above, when the rotational speed of the engine is low, the flow velocity of air, a gas mixture, or the like within the engine decreases, as compared with the case where the rotational speed of the engine is high, to thereby decrease the speed at which the engine output decreases in response to reduction of the throttle opening. Therefore, in order to effectively reduce the engine output, it is preferred that the output of the engine is reliably reduced by the engine output reduction means when the rotational speed of the engine is low. However, when the rotational vibration state of the drive wheels possibly becomes worse, it is preferred that the reduction of the output of the engine by the engine output reduction means is not performed, irrespective of the rotational speed of the engine.

By virtue of this configuration, even in the case where the degree of necessity is equal to or greater than the second reference value and the rotational speed of the engine is equal to or less than the reference value for engine rotational speed determination, the reduction of the output of the engine by the engine output reduction means is prohibited if the rotational vibration state of the drive wheels is determined to possibly become worse. Therefore, even in the case where the reduction of the output of the engine by the engine output reduction means is needed, when the rotational vibration state of the drive wheels possibly becomes worse, it is possible to reliably prevent the output of the engine from being reduced by the engine output reduction means and the rotational vibration state of the drive wheels from becoming worse due to the reduction of the engine output.

In the above-described configuration, the driving force controller may comprise means for computing a target driving force of the vehicle on the basis of the amount of drive operation by the driver and the travel condition of the vehicle, wherein a difference between two values of the first target driving force computed before and after a point in time when the degree of necessity becomes equal to or greater than the first reference value is used as a reference target driving force difference, and the reference value for engine rotational speed determination is variably set in accordance with the reference target driving force difference such that, when the reference target driving force difference is large, the reference value for engine rotational speed determination increases as compared with the case where the reference target driving force difference is small.

In general, when the reference target driving force difference is large, an amount by which the driving force of the vehicle must be actually reduced is large as compared with the case where the reference target driving force difference is small, and, therefore, it is preferred that the engine output reduction speed is high. Accordingly, when the reference target driving force difference is large, the necessity of reducing the engine output by the engine output reduction means is higher, as compared with the case where the reference target driving force difference is small.

By virtue of the above-described configuration, the reference value for engine rotational speed determination is variably set in accordance with the reference target driving force difference such that, when the reference target driving force difference is large, the reference value for engine rotational speed determination increases as compared with the case where the reference target driving force difference is small. Therefore, when the reference target driving force difference is large, the rotational speed of the engine more easily become equal to or less than the reference value for engine rotational speed determination, as compared with the case where reference target driving force difference is small, whereby the reduction of the engine output by the engine output reduction means occurs more easily.

In the above-described configuration, the second reference value may be variably set on the basis of at least one of friction properties of road surface, lateral acceleration of the vehicle, and vehicle speed.

By virtue of this configuration, the second reference value is variably set on the basis of at least one of friction properties of road surface, lateral acceleration of the vehicle, and vehicle speed. Therefore, the reduction of the engine output through delaying of the ignition timing can be properly performed in accordance with the travel condition of the vehicle, as compared with the case where the second reference value is constant.

In the above-described configuration, the second reference value may be variably set in accordance with the rotational speed of the engine such that, when the rotational speed of the engine is low, the second reference value decreases as compared with the case where the rotational speed of the engine is high.

By virtue of this configuration, the second reference value is variably set in accordance with the rotational speed of the engine such that, when the rotational speed of the engine is low, the second reference value decreases as compared with the case where the rotational speed of the engine is high. Therefore, when the rotational speed of the engine is low, the degree of necessity can be more easily determined to be equal to or greater than the second reference value, as compared with the case where the rotational speed of the engine is high, whereby the reduction of the engine output by the engine output reduction means occurs more easily.

In the above-described configuration, the driving-force reduction control means may be configured to determine the degree of necessity on the basis of at least one of a demanded reduction amount of the target driving force of the vehicle based on the travel motion condition of the vehicle, the degree of drive slippage of the drive wheels, and the friction coefficient of road surface.

By virtue of this configuration, the degree of necessity of reducing the driving force of the vehicle is determined on the basis of at least one of a demanded reduction amount of the target driving force of the vehicle on the basis of the travel motion condition of the vehicle, the degree of drive slippage of the drive wheels, and the friction coefficient of road surface. Therefore, the target driving force of the vehicle can be reduced properly such that reduction of the drive slippage of the drive wheels or securing of stable travel motion of the vehicle are properly accomplished.

In the above-described configuration, the driving-force reduction control means may be configured to compute the second target driving force, which is to be achieved through control of the throttle-opening control means, by performing filtering computation, with a first time constant, on a decrease of the first target driving force between two values of the first target driving force computed before and after a point in time when the degree of necessity becomes equal to or greater than the first reference value, and computer the third target driving force, which is to be achieved through control of the throttle-opening control means and the engine-output reduction means, by performing filtering computation, with a second time constant greater than the first time constant, on the decrease of the first target driving force between the two values of the first target driving force.

In the above-described configuration, the driving force controller may comprise means for computing a first target driving force of the vehicle on the basis of the amount of drive operation by the driver and the travel condition of the vehicle, wherein the driving-force reduction control means calculates, on the basis of two values of the first target driving force computed before and after a point in time when the degree of necessity becomes equal to or greater than the first reference value, a second target driving force which decreases more slowly than a decrease of the first target driving force between the two values and which is to be achieved through control of the throttle-opening control means and a third target driving force which decreases more slowly than the decrease of the first target driving force between the two values and faster than the second target driving force and which is to be achieved through control of the throttle-opening control means and the engine-output reduction means; and the throttle-opening control means controls the throttle opening on the basis of the second target driving force to be achieved through control of the throttle-opening control means, when the degree of necessity is equal to or greater than the first reference value.

In the above-described configuration, ignition-timing control means may be configured such that, when the degree of necessity is equal to or greater than the second reference value, the ignition-timing control means reduces the output of the engine on the basis of the deviation between the second target driving force to be achieved through control of the throttle-opening control means and the third target driving force to be achieved through control of the throttle-opening control means and the engine-output reduction means.

In the above-described configuration, the engine-output reduction means may be ignition-timing control means, wherein the driving-force reduction control means calculates, on the basis of two values of the first target driving force computed before and after a point in time when the degree of necessity becomes equal to or greater than the first reference value, a second target driving force which decreases more slowly than a decrease of the first target driving force between the two values and which is to be achieved through control of the throttle-opening control means and a third target driving force which decreases more slowly than the decrease of the first target driving force between the two values and faster than the second target driving force and which is to be achieved through control of the throttle-opening control means and the ignition-timing control means; and the driving-force reduction control means delays the ignition timing controlled by the ignition-timing control means when the degree of necessity is equal to or greater than the second reference value and the deviation between the second target driving force to be achieved through control of the throttle-opening control means and the third target driving force to be achieved through control of the throttle-opening control means and the ignition-timing control means is equal to or greater than the deviation determination reference value.

In the above-described embodiment, the ignition-timing control means may be configured such that, when the degree of necessity is equal to or greater than the second reference value, the ignition-timing control means corrects the ignition timing by delaying the ignition timing on the basis of the deviation between the second target driving force to be achieved through control of the throttle-opening control means and the third target driving force to be achieved through control of the throttle-opening control means and the ignition-timing control means.

In the above-described configuration, the engine-output reduction means may be fuel-supply-amount reduction means, wherein the driving-force reduction control means calculates, on the basis of two values of the first target driving force computed before and after a point in time when the degree of necessity becomes equal to or greater than the first reference value, a second target driving force which decreases more slowly than a decrease of the first target driving force between the two values and which is to be achieved through control of the throttle-opening control means and a third target driving force which decreases more slowly than the decrease of the first target driving force between the two values and faster than the second target driving force and which is to be achieved through control of the throttle-opening control means and the fuel-supply-amount reduction means; and the driving-force reduction control means reduces the amount of fuel supplied to the engine by the fuel-supply-amount reduction means when the degree of necessity is equal to or greater than the second reference value and the deviation between the second target driving force to be achieved through control of the throttle-opening control means and the third target driving force to be achieved through control of the throttle-opening control means and the fuel-supply-amount reduction means is equal to or greater than the deviation determination reference value.

In the above-described embodiment, the fuel-supply-amount reduction means may be configured such that, when the degree of necessity is equal to or greater than the second reference value, the fuel-supply-amount reduction means reduces the amount of fuel supplied to the engine on the basis of the deviation between the second target driving force to be achieved through control of the throttle-opening control means and the third target driving force to be achieved through control of the throttle-opening control means and the fuel-supply-amount reduction means.

In the above-described configuration, the second reference value may be variably set in accordance with friction coefficient of a road surface such that, when the road-surface friction coefficient is low, the second reference value decreases as compared with the case where the road-surface friction coefficient is high.

In the above-described configuration, the second reference value may be variably set in accordance with lateral acceleration of the vehicle such that, when the lateral acceleration of the vehicle is large, the second reference value decreases as compared with the case where the lateral acceleration of the vehicle is small.

In the above-described configuration, the second reference value may be variably set in accordance with vehicle speed such that, when the vehicle speed is high, the second reference value decreases as compared with the case where the vehicle speed is low.

In the above-described configuration, the vehicle may include travel motion controller which stabilizes travel motion of the vehicle through control of braking and driving forces of the vehicle or the wheels, wherein the degree of necessity of reducing the driving force of the vehicle is determined on the basis of an amount by which the target driving force of the vehicle is demanded to be reduced through control of the braking and driving forces of the vehicle or the wheels by the travel motion controller.

In the above-described configuration, the prohibition means may be configured such that, even when the degree of necessity is equal to or greater than the second reference value, the prohibition means prohibits the reduction of the output of the engine by the engine output reduction means when the rotational-vibration-state determination means determines that the rotational vibration state of at least one of the drive wheels possibly becomes worse.

In the above-described configuration, the means for detecting rotational vibrations of the drive wheels may include means for detecting wheels speeds of the drive wheels and detect the rotational vibrations of the drive wheels on the basis of a periodical change in the wheels speeds of the drive wheels.

In the above-described configuration, the reference value for split-$\mu$ road determination is variably set in accordance with the lower one of friction coefficients of road surfaces which the left and right drive wheels face such that, when the lower friction coefficient is low, the reference value for split-$\mu$ road determination decreases as compared with the case where the lower friction coefficient is high.

BRIEF DESCRIPTION OF THE DRAWINGS

FIG. 2 is a flowchart showing a vehicular target driving force computation routine achieved by a braking and driving force controller in the first embodiment.

BEST MODE FOR CARRYING OUT THE INVENTION

Below, some preferred embodiments of the present invention will be described in detail with reference to the accompanying drawings.

First Embodiment

Figure 1A:
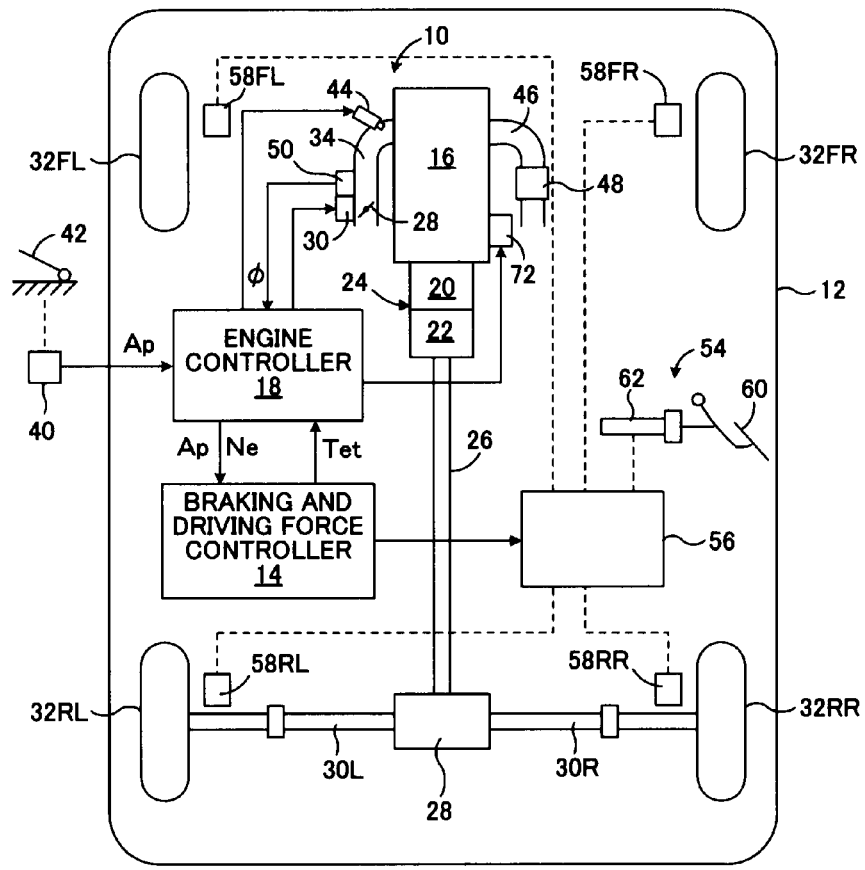
FIG. 1A is a schematic diagram showing a first embodiment of a vehicular driving force controller according to the present invention applied to a rear-wheel drive vehicle.
Figure 1B:
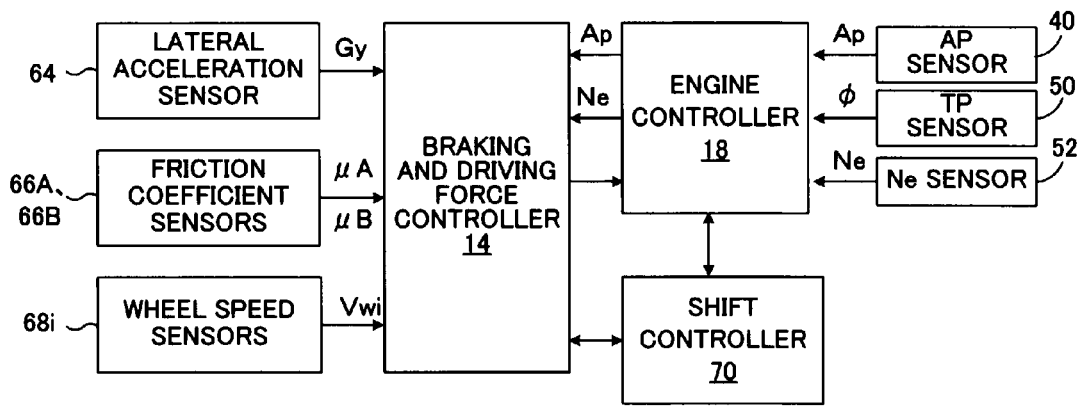
FIG. 1B is a block diagram of a control system thereof.

FIG. 1A is a schematic diagram showing a first embodiment of a vehicular driving force controller according to the present invention applied to a rear-wheel drive vehicle, and FIG. 1B is a block diagram of a control system thereof.

In FIG. 1, a driving force controller 10, which is mounted on a vehicle 12, includes a braking and driving force controller 14 that controls traveling motion of a vehicle by controlling braking and driving forces of the vehicle and the wheels; and an engine controller 18 that controls a spark ignition engine 16. The driving force of the engine 16 is transmitted to a propeller shaft 26 via an automatic transmission 24 which includes a torque converter 20 and a transmission 22. The driving force of the propeller shaft 26 is transmitted to left-rear and right-rear wheel axles 30L and 30R by a differential 28, whereby left and right rear wheels 32RL and 32RR, which are drive wheels, are rotated and driven.

Meanwhile, left and right front wheels 32FL and 32FR, which are steerable, follower wheels, are steered by an unillustrated power steering system of a rack and pinion type via respective tie rods in a known manner. The power steering system is driven in response to steering operation of a steering wheel by a driver.

The amount of air taken into the engine 16 is controlled by a throttle valve 36 provided in an intake passage 34. The throttle valve 36 is driven by a throttle actuator 38 which includes an electric motor. The opening of the throttle valve 36, that is, throttle opening is controlled by the engine controller 18 via the throttle actuator 38 in accordance with an amount of depression of an accelerator pedal 42, the amount of depression being detected by an accelerator position sensor 40. In addition, an injector 44 for injecting fuel such as gasoline is provided along the intake passage 34 of the engine 16 at each of positions corresponding to intake ports of individual cylinders of the engine. The amount of fuel injected by the injector 44, that is, the amount of fuel supplied to the engine 16 is controlled by the engine controller 18 in accordance with an intake air amount Ra detected by an unillustrated airflow meter, whereby the output of the engine is controlled so as to be increased or decreased.

As is well known, fuel injected by the injector 44 is mixed with intake air, and the air-fuel mixture is combusted by being ignited by an unillustrated spark plug, whereby the engine 16 produces a driving force. Exhaust gas generated due to combustion of the air-fuel mixture is emitted to an exhaust pipe 46 via an unillustrated exhaust manifold, purified by an exhaust gas purification catalyst 48 provided in the exhaust pipe 46, and subsequently released to the atmosphere via an illustrated muffler.

The engine controller 18 receives a signal representing the amount of depression of the accelerator pedal 42 (accelerator opening Ap) from the accelerator position sensor (AP sensor) 40, a signal representing an opening φ of the throttle valve 36 from a throttle position sensor (TP sensor) 50, and a signal representing an engine rotational speed Ne from an engine rotational speed sensor (Ne sensor) 52. In addition, the engine controller 18 receives, from unillustrated sensors, signals representing other pieces of information required for controlling the engine.

Braking forces of the left and right front wheels 32FL, 32FR and the left and right rear wheels 32RL, 32RR are controlled through control of respective braking pressures of corresponding wheel cylinders 58FL, 58FR, 58RL, 58RR by a hydraulic circuit 56 of a braking apparatus 54. The hydraulic circuit 56 includes a reservoir, an oil pump, and various valve units, etc., although they are not illustrated. Pressure in each wheel cylinder, that is, braking pressure of each wheel, is usually controlled by pressure in a master cylinder 62 driven by driver's operation of depressing a brake pedal 60, and is as necessary controlled so as to be higher than the pressure in the master cylinder 62 through control of the hydraulic circuit 56.

As illustrated in FIG. 1B, the braking and driving force controller 14 receives a signal representing a lateral acceleration Gy of the vehicle from a lateral acceleration sensor 64, signals respectively representing road-surface friction coefficients μA and μB from friction coefficient sensors 66A and 66b that are respectively provided so as to correspond to the left and right wheels, and signals representing wheel speeds Vwi (i=FL, FR, RL, RR) of the left and right front wheels and the left and right rear wheels from wheel speed sensors 68i (i=FL, FR, RL, RR). The braking and driving force controller 14, the engine controller 18, and a shift controller 70 which controls a gear position of the automatic transmission 24 transmits and receives with each other the required signals, as necessary.

In actuality, each of the braking and driving force controller 14, the engine controller 18, and the shift controller 70, may include a microcomputer of a known configuration and a drive circuit. The microcomputer includes a CPU, ROM, RAM, and I/O port devices, etc., which are mutually connected by a bidirectional common bus. The lateral acceleration Gy of the vehicle detected by the lateral acceleration sensor 64 assumes a positive value when the vehicle turns leftward.

The engine controller 18 computes a basic target driving force Fxta of the vehicle from the accelerator opening Ap, etc. in a manner known in the present technical field, and outputs a signal representing the basic target driving force Fxta of the vehicle to the braking and driving force controller 14. The braking and driving force controller 14 determines whether or not the driving force of the vehicle need be reduced in order to cause the vehicle to travel stably, on the basis of travel conditions of the vehicle, particularly the road-surface friction coefficient, drive slippage conditions of the drive wheels, and travel motion conditions of the vehicle. If the braking and driving force controller 14 determines that the driving force of the vehicle need be reduced, it computes the target driving force Fxt of the vehicle in order to cause the vehicle to travel stably on the basis of the road-surface friction coefficient, the drive slippage conditions of the drive wheels, and the travel motion conditions of the vehicle, and outputs a signal representing the target driving force Fxt of the vehicle to the engine controller 18. On the contrary, if the braking and driving force controller 14 determines that the driving force of the vehicle need not be reduced, it sets the target driving force Fxt of the vehicle to the basic target driving force Fxta, and outputs a signal representing the target driving force Fxt of the vehicle to the engine controller 18.

The engine controller 18 computes a target gear position St of the automatic transmission 24 and a target throttle opening φt on the basis of the target driving force Fxt of the vehicle, and outputs a signal representing the target gear position St to the shift controller 70. The shift controller 70 controls the automatic transmission 24 so that the gear position of the automatic transmission 24 coincides with the target gear position St. The engine controller 18 also computes a target advance angle θt of the ignition timing on the basis of the intake air amount Ra detected by the unillustrated airflow meter and the engine rotational speed Ne.

Particularly, in the first embodiment as illustrated, the braking and driving force controller 14 computes a vehicle body speed (vehicle speed) Vb, in a manner known in the present technical field, on the basis of the wheel speeds Vwi of the individual wheels detected by the wheel speed sensors 68i. In addition, the braking and driving force controller 14 computes drive slippage amounts SArl, SArr of the left and right rear wheels, respectively, on the basis of the wheel speeds of the left and right rear wheels and the vehicle body speed Vb, and computes a mean value SAa of the drive slippage amounts SArl and SArr of the left and right rear wheels as an indicator value that represents the degree of necessity of reducing the driving force of the vehicle.

Next, the braking and driving force controller 14 determines whether or not the indicator value SAa is equal to or greater than a first reference value SAa1 (positive constant). If the indicator value SAa is less than the first reference value SAa1, the braking and driving force controller 14 sets a throttle opening reduction request flag Fth to 0, and outputs to the engine controller 18 a signal indicating that the throttle opening reduction request flag Fth is 0.

Figure 5:
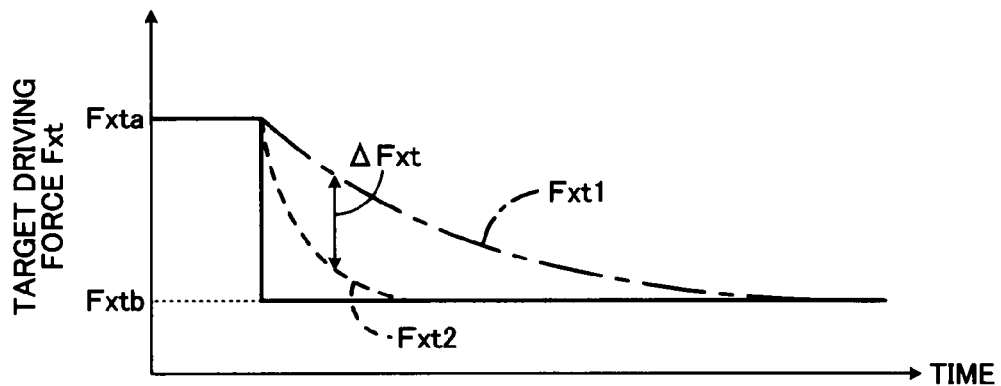
FIG. 5 is a graph showing example decreases of a target driving force Fxt, a target driving force Fxt1 to be achieved through throttle-opening reduction control, and a target driving force Fxt2 to be achieved through throttle-opening reduction control and ignition-timing delay control in the first embodiment.

In addition, when the indicator value SAa which has been less than the first reference value SAa1 becomes equal to or greater than the first reference value SAa1, the braking and driving force controller 14 computes a target driving force Fxt1 to be achieved through the throttle-opening reduction control, by means of, for example, filtering computation performed on the target driving force Fx. As shown in FIG. 5, the target driving force Fxt1 decreases at a speed slower than a speed at which the target driving force Fxt decreases from the target driving force Fxt (Fxta) of the vehicle computed just before the indicator value SAa becomes equal to or greater than the first reference value SAa1 to a target diving force Fxt (Fxtb) of the vehicle computed just after the indicator value SAa becomes equal to or greater than the first reference value SAa1. The braking and driving force controller 14 also computes a target driving force Fxt2 to be achieved through the throttle-opening reduction control and the ignition-timing delay control, by means of, for example, filtering computation performed on the target driving force Fx. The target driving force Fxt2 decreases more slowly than the target driving force Fxt and faster than the target driving force Fxt1.

In this case, a time constant for the filtering for computing the target driving force Fxt1 to be achieved through the throttle-opening reduction control is set in accordance with the responsiveness with which the driving force of the vehicle decreases in response to the reduction of the opening of the throttle valve 36. As a result, the target driving force Fxt1 to be achieved through the throttle-opening reduction control is computed so that its decrease corresponds to a decrease in the driving force of the vehicle which is achieved by reducing the opening of the throttle valve 36 at the time when the engine rotational speed Ne assumes an ordinary value during travel of the vehicle. Similarly, a time constant for filtering for computing the target driving force Fxt2 to be achieved through the throttle-opening reduction control and the ignition-timing delay control is set in accordance with the responsiveness with which the driving force of the vehicle decreases through the throttle-opening reduction control and the ignition-timing delay control. As a result, the target driving force Fxt2 to be achieved through the throttle-opening reduction control and the ignition-timing delay control is computed so that its decrease corresponds to a decrease in the driving force of the vehicle which is achieved by the throttle-opening reduction control and the ignition-timing delay control at the time when the engine rotational speed Ne assumes an ordinary value during the travel of a vehicle.

When the indicator value SaA is equal to or greater than the first reference value SAa1, the braking and driving force controller 14 computes a target throttle opening φtb on the basis of the target driving force Fxt1 to be achieved through the throttle opening control, sets the throttle opening reduction request flag Fth to 1, and outputs to the engine controller 18 a signal representing the target throttle opening φtb and a signal representing that the throttle opening reduction request flag Fth is 1.

When the engine controller 18 has received, from the braking and driving force controller 14, a signal indicating that the throttle opening reduction request flag Fth is 0, it controls the throttle actuator 38 so that the opening of the throttle valve 36 coincides with the target throttle opening φt. On the contrary, when the engine controller 18 has received, from the braking and driving force controller 14, a signal representing the target throttle opening φtb and a signal indicating that the throttle opening reduction request flag Fth is 1, it controls the throttle actuator 38 so that the opening of the throttle valve 36 coincides with the target throttle opening φtb, whereby the engine controller 18 reduces the output of the engine 16.

If the indicator value SAa is equal to or greater than a second reference value SAa2 (positive value) that is greater than the first reference value SAa1, the braking and driving force controller 14 determines whether or not a deviation ΔFxt (=Fxt1−Fxt2) between the target driving force Fxt1 to be achieved through the throttle-opening reduction control and the target driving force Fxt2 to be achieved through the throttle-opening reduction control and the ignition-timing delay control is equal to or greater than a deviation determination reference value Fxt3 (positive constant). If the deviation ΔFxt of the target driving forces is equal to or greater than the deviation determination reference value Fxt3, the braking and driving force controller 14 computes an ignition timing delay correction amount θtb on the basis of the deviation ΔFxt of the target driving forces, sets an ignition timing delay request flag Fig to 1, and outputs to the engine controller 18 a signal representing the ignition timing delay correction amount θtb and a signal indicating that the ignition timing delay request flag Fig is 1.

If the indicator value SAa is equal to or greater than the first reference value SAa1 but is less than the second reference value SAa2, or, if the indicator value SAa is equal to or greater than the second reference value SAa2 but the deviation ΔFxt of the target driving forces is less than the deviation determination reference value Fxt3, the braking and driving force controller 14 resets the ignition timing delay correction amount θtb to 0, and resets the ignition timing delay request flag Fig to 0.

When the engine controller 18 has received, from the braking and driving force controller 14, a signal indicating that the gnition timing delay request flag Fig is 0, it controls a distributor 72 on the basis of the uncorrected target advance angle θt, to thereby control the ignition timing, that is, an output timing of ignition current to unillustrated spark plugs of the individual cylinders by means of the distributor 52. On the contrary, when the engine controller 18 has received, from the braking and driving force controller 14, a signal indicating that the ignition timing delay request flag Fig is 1, it corrects the ignition timing target advance angle θt toward the delay side by the delay correction amount θtb, controls the distributor 72 on the basis of the corrected target advance angle θta (=θt−θtb) so as to delay the ignition timing, to thereby reduce the output of the engine 16.

Next, a vehicular target driving force computation routine achieved by the braking and driving force controller 14 in the first embodiment will be described with reference to the flowchart shown in FIG. 2. Control according to the flowchart shown in FIG. 2 is started when an unillustrated ignition switch is turned on, and is repeatedly executed at predetermined time intervals. This also applies to controls according to other flowcharts to be described later.

First, in step 210, a signal representing the wheel speeds Vwi detected by the wheel speed sensors 68i and other signals are read. In step 220, a determination is made, in a manner known in the present technical field, as to whether or not a traveling behavior of the vehicle has become worse (e.g., a spin status or a drift-out status). If a negative determination is made, the control proceeds to step 250. If a positive determination is made, then in step 220, the target driving force Fxt of the vehicle that is required for stabilizing the traveling behavior of the vehicle is computed in a manner known in the present technical field.

In step 225, the drive slippage amounts SArl, SArr of the left and right rear wheels are respectively computed on the basis of the wheel speeds VwRL, VwRR of the left and right rear wheels and the vehicle body speed Vb. At the same time, the mean value of the drive slippage amounts SArl and SArr of the left and right rear wheels is computed as the indicator value SAa that represents the degree of necessity of reducing the driving force of the vehicle.

In step 230, a determination is made as to whether or not the indicator value SAa is equal to or greater than the first reference value SAa1, that is, whether or not a control for reducing the output torque of the engine 16 through the throttle opening control is needed. If a negative determination is made, the control proceeds to step 240. If a positive determination is made, then in step 235, the target driving force Fxt of the vehicle that is required for reducing the drive slippages of the left and right rear wheels is computed on the basis of the indicator value SAa in a manner known in the present technical field.

In step 240, the road-surface friction coefficient μ is computed as the mean value of the road-surface friction coefficients μA and μB detected by the friction coefficient sensors 66A and 66b, respectively. At the same time, a determination is made as to whether or not the road-surface friction coefficient μ is equal to or smaller than a reference value μo (positive constant), that is, whether or not there is a possibility that the drive slippages of the left and right rear wheels become excessively large. If a negative determination is made, the control proceeds to step 250. If a positive determination is made, then in step 245, the target driving force Fxt of the vehicle that is required for reducing the possibility that the drive slippages of the left and right rear wheels become excessively large is computed on the basis of the road-surface friction coefficient μ in a manner known in the present technical field.

In step 250, the target driving force fxt of the vehicle is set to the basic target driving force Fxta of the vehicle. In step 255, the target driving force Fxt of the vehicle that is computed in steps 220, 235, 245 or 250 is output to the engine controller 18.

Next, a vehicular target driving force and ignition timing correction and control routine, which is achieved by the braking and driving force controller 14 in the first embodiment, will be described with reference to the flowchart shown in FIG. 3.

First, in step 310, a signal representing the indicator value SAa computed in the vehicular target driving force computation routine shown in FIG. 2 and other signals are read. In step 315, a determination is made as to whether or not the indicator value SAa is equal to or greater than the first reference value SAa1, that is, whether or not the control for reducing the output torque of the engine 16 through the throttle opening control is needed. If a positive determination is made, the control proceeds to step 325. If a negative determination is made, then in step 320, the throttle opening reduction request flag Fth is reset to 0, and subsequently the control proceeds to step 380.

In step 325, the target driving force Fxt1 to be achieved through the throttle-opening reduction control is computed, for example, by means of filtering computation of the target driving force Fxt, such that the target driving force Fxt1 decreases at a speed slower than the speed at which the target driving force Fxt of the vehicle changes from the value as computed just before the indicator value SAa becomes equal to or greater than the first reference value SAa1 to the value as computed just after the indicator value SAa becomes equal to or greater than the first reference value SAa1. At the same time, the target driving force Fxt2 to be achieved through the ignition-timing delay control is computed, for example, by means of filtering computation of the target driving force Fxt such that the target driving force Fxt2 decreases more slowly than the target driving force Fxt and faster than the target driving force Fxt1.

Figure 6:
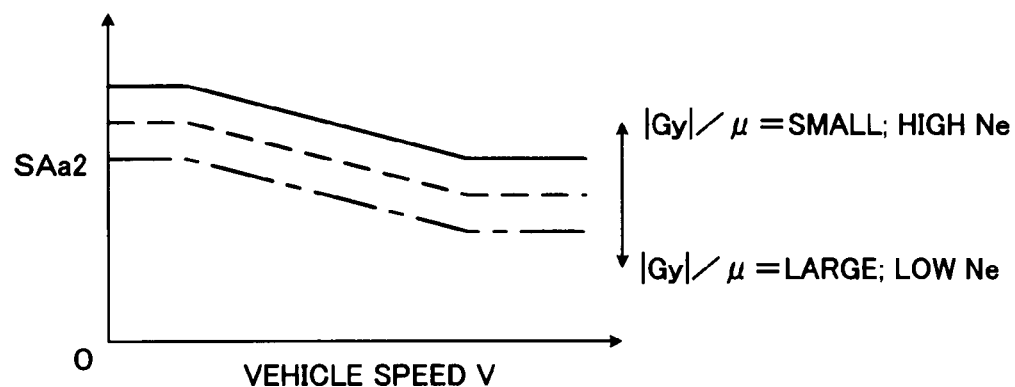
FIG. 6 is a graph showing a map for computing a second reference value SAa2 on the basis of vehicle speed Vb, the absolute value of lateral acceleration Gy of the vehicle and road-surface friction coefficient μ.

In step 335, the throttle opening reduction request flag Fth is set to 1, and the target throttle opening φtb for rendering the driving force of the vehicle coincident with the target driving force Fxt1 is computed on the basis of the target driving force Fxt1 to be achieved through the throttle-opening reduction control and the information regarding the gear position of the automatic transmission 24 which is input from the shift controller 70. In step 340, by reference to a map shown in FIG. 6, the second reference value SAa2 for the indicator value SAa is computed on the basis of the vehicle speed Vb, the lateral acceleration Gy of the vehicle, the road-surface friction coefficient μ, and the engine rotational speed Ne. In this case, as shown in FIG. 6, the second reference value SAa2 is computed so that it decreases as the vehicle speed Vb increases, as the absolute value of the lateral acceleration Gy of the vehicle increases, as the road-surface friction coefficient μ decreases, and as the engine rotational speed Ne decreases.

In step 345, a determination is made as to whether or not the indicator value SAa is equal to or greater than the second reference value SAa2, that is, whether or not the control for reducing the output torque of the engine 16 through the ignition-timing delay control is needed. If a negative determination is made, the control proceeds to step 380, and if a positive determination is made, the control proceeds to step 350.

Figure 7:
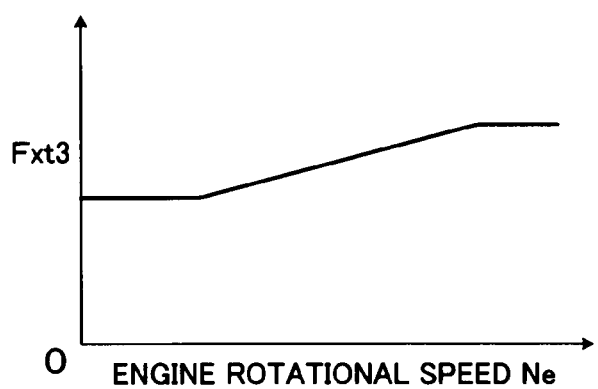
FIG. 7 is a graph showing a map for computing a deviation determination reference value Fxt3 on the basis of engine rotational speed Ne.

In step 350, the deviation determination reference value Fxt3 is computed on the basis of the engine rotational speed Ne according to a map shown in FIG. 7, so that the deviation determination reference value Fxt3 decreases as the engine rotational speed Ne decreases.

In step 355, a determination is made as to whether or not the deviation ΔFxt between the target driving force Fxt1 to be achieved through the throttle-opening reduction control and the target driving force Fxt2 to be achieved through the ignition-timing delay control is equal to or greater than the deviation determination reference value Fxt3, that is, whether or not the vehicle is in a sate where the control for reducing the output torque of the engine 16 through the ignition-timing delay control is permitted. If a positive determination is made, the control proceeds to step 385. If a negative determination is made, then in step 380, the ignition timing delay request flag Fig is reset to Off, and the ignition timing delay correction amount θtb is set to 0. Subsequently, the control proceeds to step 390.

In step 385, the ignition timing delay request flag Fig is set to 1, and the ignition timing delay correction amount θt is computed on the basis of the target driving force Fxt2 to be achieved through the ignition-timing delay control, so that the ignition timing delay correction amount θt increases as the target driving force Fxt2 to be achieved through the ignition-timing delay control decreases. In step 390, signals representing the throttle opening reduction request flag Fth, the target throttle opening φstb, the ignition timing delay request flag Fig, and the ignition timing delay correction amount θt are output to the engine controller 18, and subsequently the control returns to step 310.

Next, a routine for controlling the throttle opening and the ignition timing, which is achieved by the engine controller 18 in the first embodiment, will be described with reference to the flowchart shown in FIG. 4.

First, in step 410, a signal representing the target driving force Fxt of the vehicle and other signals are read. In step 415, the target gear position St of the automatic transmission 24 is computed on the basis of the target driving force Fxt in a manner known in the present technical field, and a signal representing the target gear position St is output to the shift controller 70.

In step 420, the target throttle opening φt is computed on the basis of the target driving force Fxt in a manner known in the present technical field. In step 425, the ignition timing target advance angle θt is computed on the basis of the intake air amount Ra detected by the airflow meter and the engine rotational speed Ne.

In step 430, a determination is made as to whether or not the throttle opening reduction request flag Fth is 1, that is, whether or not the vehicle is in the situation where the throttle opening must be reduced. If a negative determination is made, then in step 435, the throttle actuator 38 is controlled so that the opening of the throttle valve 36 coincides with the target throttle opening φt. If a positive determination is made, then in step 440, the throttle actuator 38 is controlled so that the opening of the throttle valve 36 coincides with the reduced target throttle opening φtb.

In step 445, a determination is made as to whether or not the ignition timing delay request flag Fig is 1, that is, whether or not the vehicle is in the situation where the ignition timing must be delayed. If a negative determination is made, then in step 445, the distributor 72 is controlled on the basis of the uncorrected target advance angle θt. If a positive determination is made, then in step 450, the distributor 72 is controlled on the basis of the target advance angle θta (=θt−θtb) having undergone the delay correction.

As described above, according to the first embodiment as illustrated, in the vehicular target driving force computation routine shown in FIG. 2, the target driving force Fxt of the vehicle is set in two different ways depending on whether or not the driving force of the vehicle need be reduced in order to cause the vehicle to travel stably. That is, in the case where it is determined that the driving force of the vehicle need not be reduced in order to cause the vehicle to travel stably on the basis of the road-surface friction coefficient, the drive slippage conditions of the drive wheels, and the travel motion conditions of the vehicle, the target driving force Fxt of the vehicle is set to the basic target driving force Fxta which is computed on the basis of the accelerator opening Ap, etc. In the case where it is determined that the driving force of the vehicle need be reduced in order to cause the vehicle to travel stably on the basis of the road-surface friction coefficient, the drive slippage conditions of the drive wheels, and the travel motion conditions of the vehicle, the target driving force Fxt of the vehicle is computed to assume a value for causing the vehicle to travel stably, on the basis of the road-surface friction coefficient, the drive slippage conditions of the drive wheels, and the travel motion conditions of the vehicle.

Figure 3:
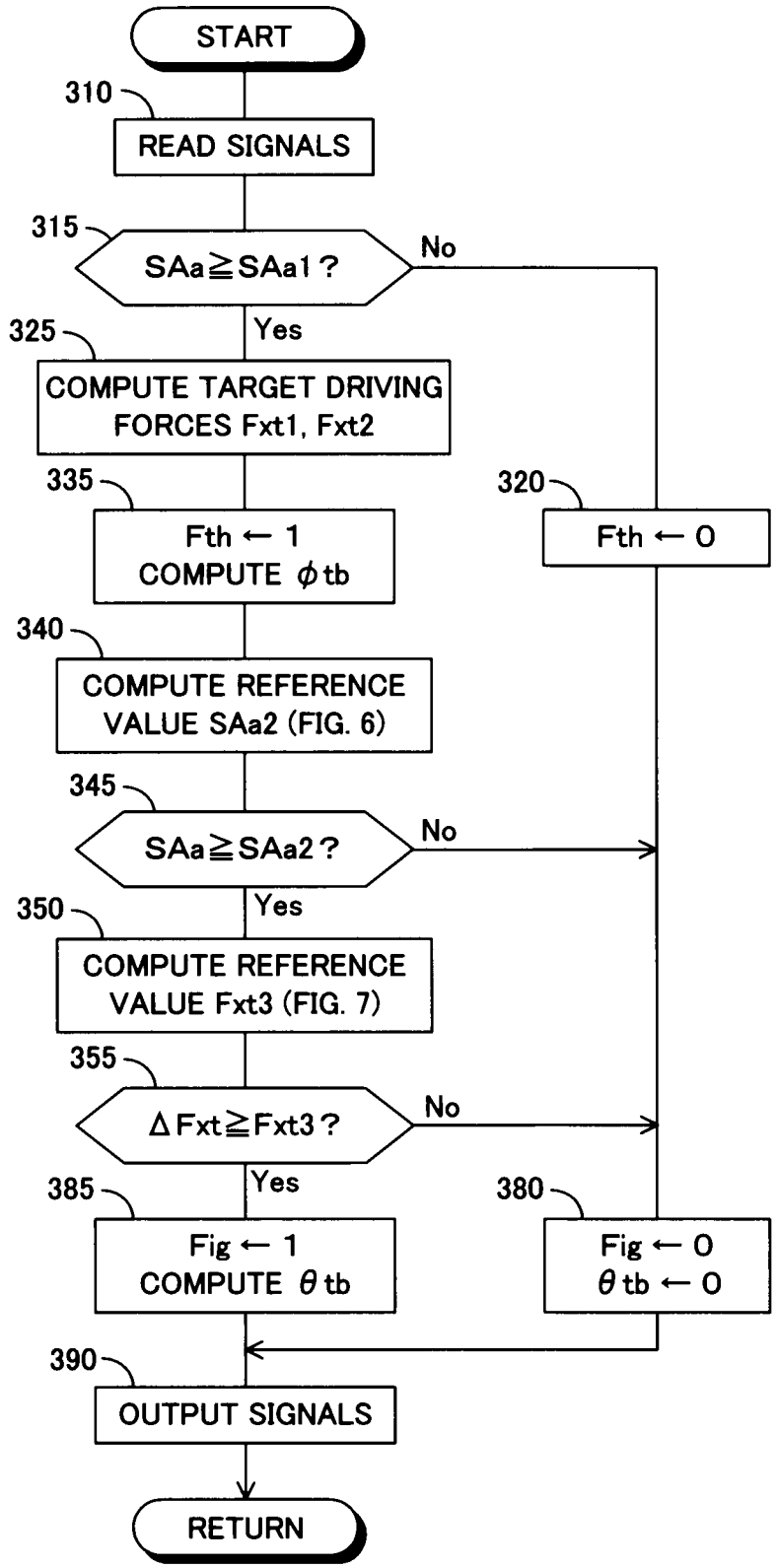
FIG. 3 is a flowchart showing a vehicular target driving force and ignition timing correction and control routine achieved by the braking and driving force controller in the first embodiment.

In addition, in step 315 of the vehicular target driving force and ignition timing correction and control routine shown in FIG. 3, a determination as to whether the control for reducing the output torque of the engine 16 through the throttle opening control is needed is made by determining whether or not the indicator value SAa representing the degree of necessity of reducing the driving force of the vehicle, that is, the mean value of the drive slippage amounts SArl and SArr of the left and right rear wheels, is equal to or greater than the first reference value SAa1.

Next, if a positive determination is made in step 315, then in step 330, the target driving force Fxt1 to be achieved through the throttle-opening reduction control is computed such that the target driving force Fxt1 decreases more slowly than the target driving force Fxt so as to match the responsiveness with which the driving force of the vehicle decreases through the actual throttle-opening reduction control. At the same time, the target driving force Fxt2 to be achieved through the throttle-opening reduction control and the ignition-timing delay control is computed so that the target driving force Fxt2 decreases more slowly than the target driving force Fxt and faster than the target driving force Fxt1 so as to match the responsiveness with which the driving force of the vehicle decreases through the actual throttle-opening reduction control and the actual ignition-timing delay control.

In addition, in step 345, a determination as to whether the control for reducing the output torque of the engine 16 through the ignition-timing delay control is needed is made by determining whether or not the indicator value SAa is equal to or greater than the second reference value SAa2. In step 355, a determination as to whether or not the vehicle is in a state where the control for reducing the output torque of the engine 16 through the ignition-timing delay control is permitted is made by determining whether or not the deviation ΔFxt between the target driving force Fxt1 to be achieved through the throttle opening control and the target driving force Fxt2 to be achieved through the ignition-timing delay control is equal to or greater than the deviation determination reference value Fxt3.

Figure 4:
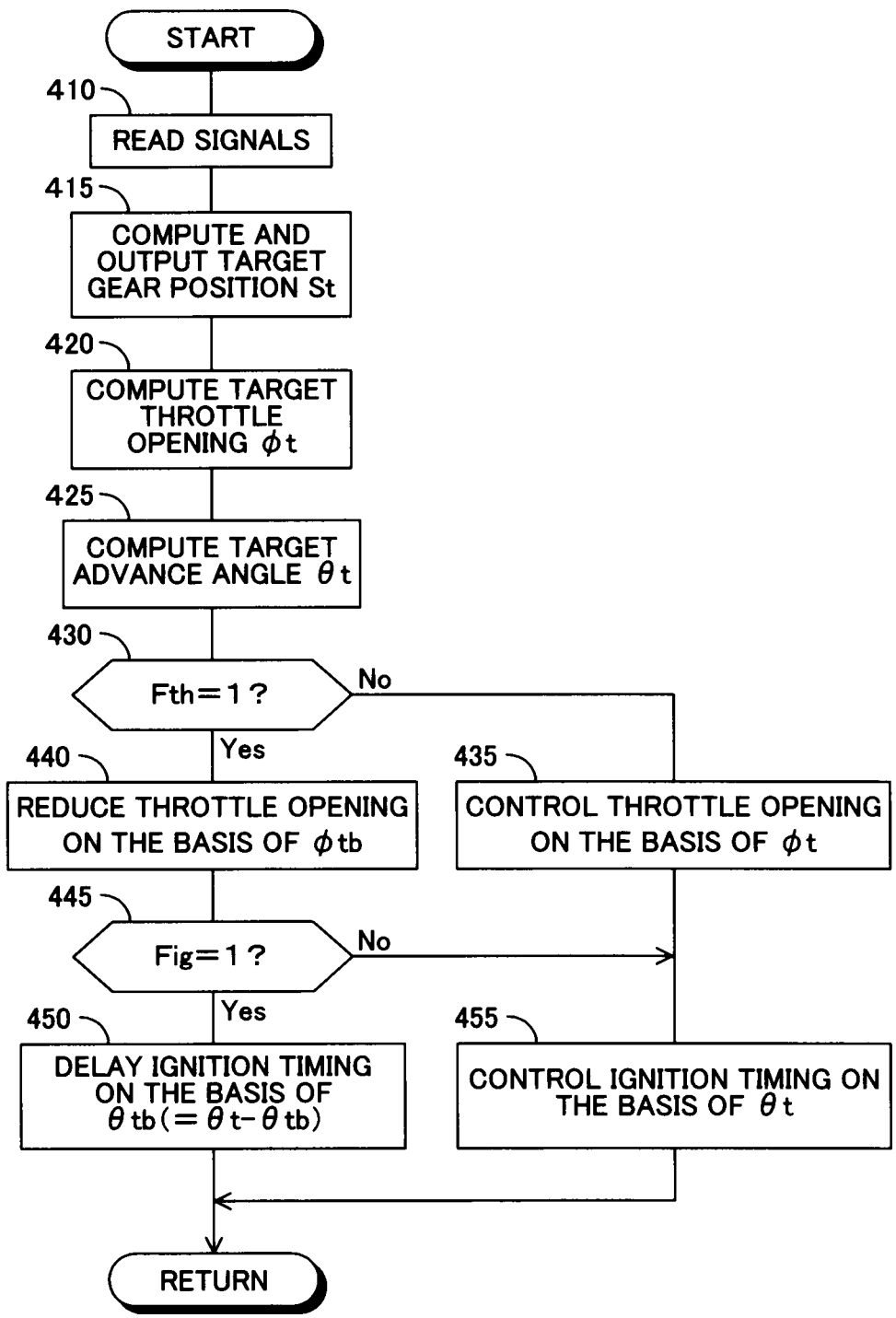
FIG. 4 is a flowchart showing a routine for controlling throttle opening and ignition timing, the routine being achieved by an engine controller in the first embodiment.

In addition, in the case where positive determinations are made in steps 330, 345 and 355, the control for reducing the output torque of the engine 16 through the throttle-opening reduction control and the control for reducing the output torque of the engine 16 through the ignition-timing delay control are executed by steps 335 and 385 of the present routine and steps 440 and 450 of the throttle opening and ignition timing control routine shown in FIG. 4. On the contrary, in the case where a negative determination is made in step 345 or 355 even if a positive determination is made in step 330, or in the case where a positive determination is made in step 370 or 375 even if a positive determination is made in each of steps 330, 345 and 355, only the control for reducing the output torque of the engine 16 through the throttle opening control is executed by step 380 of the present routine and by steps 440 and 455 of the throttle opening and ignition timing control routine shown in FIG. 4, and thus the ignition timing is controlled as usual without being delayed.

Therefore, according to the first embodiment, it is possible to perform the control for reducing the output torque of the engine 16 through the ignition-timing delay control in addition to the control for reducing the output torque of the engine 16 through the throttle-opening reduction control, only in the state where the indicator value SAa is large and thus the degree of necessity of reducing the output torque of the engine 16 is very high. Therefore, in the state where reduction of the driving force of the vehicle is needed but the degree of necessity thereof is not very high, it is possible to prevent the ignition timing from being delayed, and thus it is possible to prevent an increase in the temperature of exhaust gas of the engine and resultant deterioration of the exhaust gas purification catalyst 48. In addition, in the state where the degree of necessity of reducing the driving force of the vehicle is very high, it is possible to reliably and effectively reduce the driving force of the vehicle by reliably and effectively decreasing the output of the engine by delaying the ignition timing as well as by reducing the throttle opening.

Figure 8:
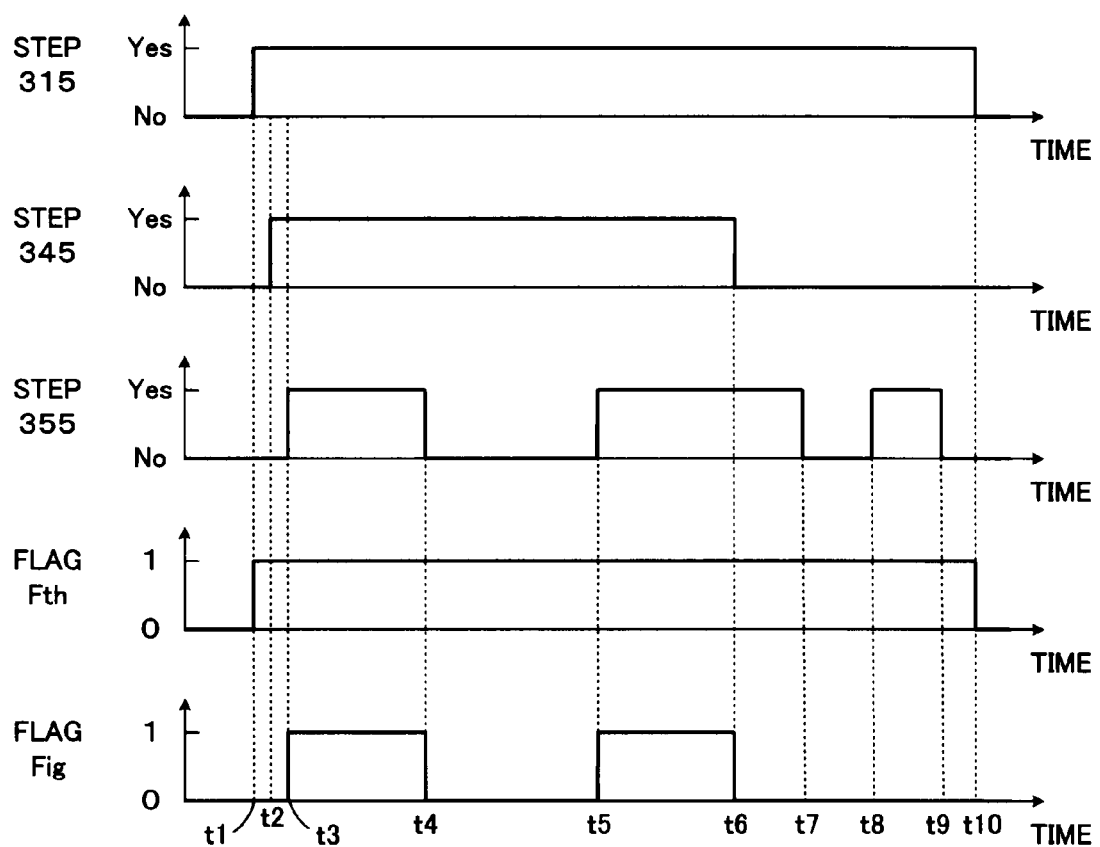
FIG. 8 is a time chart showing examples results of determinations in steps 315, 345, and 355 of FIG. 3 and example changes of a throttle opening reduction request flag Fth and an ignition timing delay request flag Fig.

Assume that, as shown in FIG. 8, for example, due to increase and decrease of the indicator value SAa, in step 315, a positive determination is made at a time point t1 and a negative determination is made at a time point t10, and in step 345, a positive determination is made at a time point t2 that is later than the time point t1 and a negative determination is made at a time point t6 that is earlier than the time point t10. Assume also that, in step 355, a positive determination is made at a time point t3 that is later than the time point t2, negative and positive determinations are made at time points t4 and t5, respectively, that are earlier than the time point t6, a negative determination is made at a time point t7 that is later than the time point t6, and positive and negative determinations are made at time points t8 and t9, respectively, that are earlier than the time point t10.

In such a case, the throttle opening reduction request flag Fth is set to 1 from the time point t1 to the time point t10, and the ignition timing delay request flag Fig is set to 1 from the time point t3 to the time point t4 and from the time point t5 to the time point t6. Therefore, while the throttle opening is reduced from the time point t1 to the time point t10, the ignition timing is delayed in the period from the time point t3 to the time point t4 and the period from the time point t5 to the time point t6.

Generally, when the engine rotational speed Ne is low, the flow velocity of air, a gas mixture, or the like in the engine 16 becomes lower, as compared with the case where the engine sped Ne is high. As a result of this, the speed at which the engine output decreases through reduction of the throttle opening decreases. Therefore, in order to reduce the engine output effectively, the degree of necessity of delaying the ignition timing is high when the engine rotational speed Ne is low, as compared with the case where the engine rotational speed Ne is high.

Particularly, according to the first embodiment as illustrated, in step 350, the deviation determination reference value Fxt3 is variably set in accordance with the map shown in FIG. 7, so that the deviation determination reference value Fxt3 decreases as the engine rotational speed Ne decreases. Therefore, when the engine rotational speed Ne is low, the deviation ΔFxt of the target driving forces can be more easily determined to be equal to or greater than the deviation determination reference value Fxt3, as compared with the case where the engine rotational speed Ne is high. Therefore, it is possible to effectively decrease the engine output through delaying the ignition timing, to thereby effectively decrease the driving force of the vehicle, even in the state where the engine rotational speed Ne is low and thus the speed at which the engine output decreases through reduction of the throttle opening is low.

Second Embodiment

Figure 9:
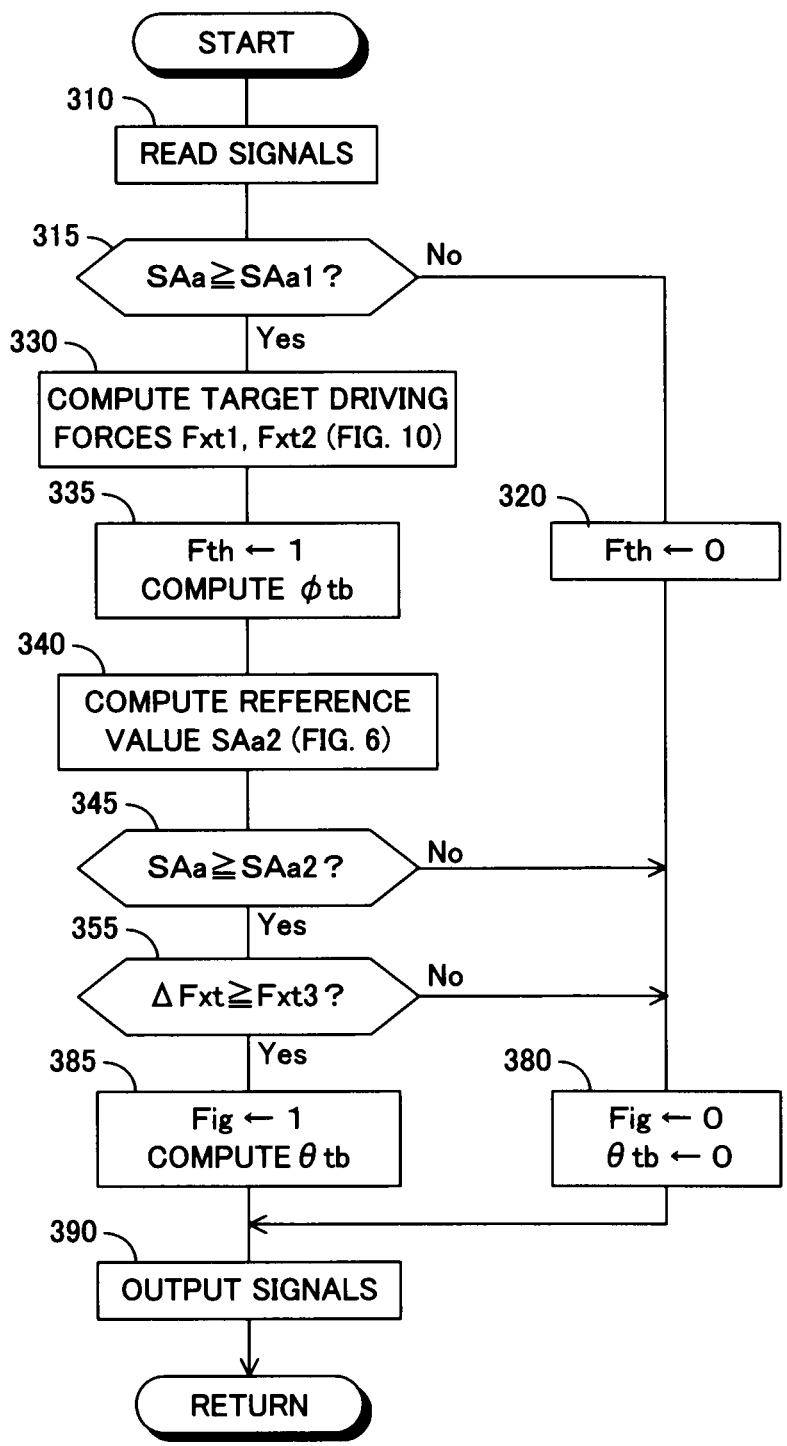
FIG. 9 is a flowchart showing a vehicular target driving force and ignition timing correction and control routine achieved by the braking and driving force controller in a second embodiment.

FIG. 9 is a flowchart showing the vehicular target driving force and ignition timing correction control routine, which is achieved by the braking and driving force controller 14 in a second embodiment of the vehicular driving force controller according to the present invention. In FIG. 9, the same steps as those shown in FIG. 3 are denoted by the same step numbers as in FIG. 3.

In the present embodiment, the individual steps of the vehicular target driving force computation routine and the throttle opening and ignition timing control routine are executed in the same manner as in the above-described first embodiment. Although, steps 310 to 320, steps 335 to 345, and steps 355 to 390 are also executed in the same manner as in the above-described first embodiment, a step corresponding to step 350 in the first embodiment is omitted.

Figure 10:
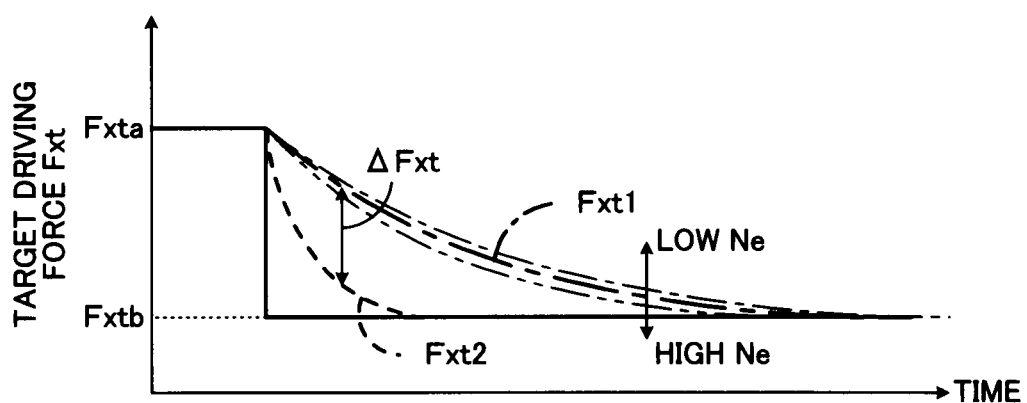
FIG. 10 is a graph showing example decreases of the target driving force Fxt, the target driving force Fxt1 to be achieved through throttle-opening reduction control, and the target driving force Fxt2 to be achieved through throttle-opening reduction control and ignition-timing delay control in the second embodiment.

As shown in FIG. 9, when a positive determination is made in step 315, then in step 330, the target driving force Fxt1 to be achieved through the throttle-opening reduction control and the target driving force Fxt2 to be achieved through the ignition-timing delay control are computed in the same manner as in the above-described first embodiment. However, as shown in FIG. 10, the rate of decrease of the target driving force Fxt1 to be achieved through the throttle-opening reduction control is variably set in accordance with the engine rotational speed Ne at the time when the indicator value SAa becomes equal to or greater than the first reference value SAa1, so that the rate of decrease of the target driving force Fxt1 to be achieved through the throttle-opening reduction control decreases as the engine rotational speed Ne decreases. Note that this variable setting copes with the fact that the rate of decrease of the driving force of the vehicle through the throttle-opening reduction control decreases as the engine rotational speed Ne decreases.

As described above, according to the second embodiment as illustrated, as in the above-described first embodiment, it is possible to perform the control for reducing the output torque of the engine 16 through the ignition-timing delay control in addition to the control for reducing the output torque of the engine 16 through the throttle-opening reduction control, only in the state where the indicator value SAa is large and thus the degree of necessity of reducing the output torque of the engine 16 is very high. Therefore, in the state where reduction of the driving force of the vehicle is needed but the degree of necessity thereof is not very high, it is possible to prevent the ignition timing from being delayed, and thus it is possible to prevent an increase in the temperature of exhaust gas of the engine and resultant deterioration of the exhaust gas purification catalyst. In addition, in the state where the degree of necessity of reducing the driving force of the vehicle is very high, it is possible to reliably and effectively decrease the output of the engine by reducing the throttle opening and by delaying the ignition timing, to thereby reliably and effectively decrease the driving force of the vehicle.

In addition, according to the second embodiment, the rate of decrease of the target driving force Fxt1 to be achieved through the throttle-opening reduction control is variably set in accordance with the engine rotational speed Ne at the time when the indicator value SAa becomes equal to or greater than the first reference value SAa1, so that the rate of decrease of the target driving force Fxt1 to be achieved through the throttle-opening reduction control decreases as the engine rotational speed Ne decreases. Accordingly, as the engine rotational speed Ne decreases, the deviation ΔFxt of the target driving forces increases, so that a positive determination can be more easily made in step 355. Therefore, as in the above-described first embodiment, it is possible to effectively decrease the engine output by delaying the ignition timing, to thereby effectively decrease the driving force of the vehicle, even in the state where the engine rotational speed Ne is low and thus the speed at which the engine output decreases through reduction of the throttle opening.

Third Embodiment

Figure 11:
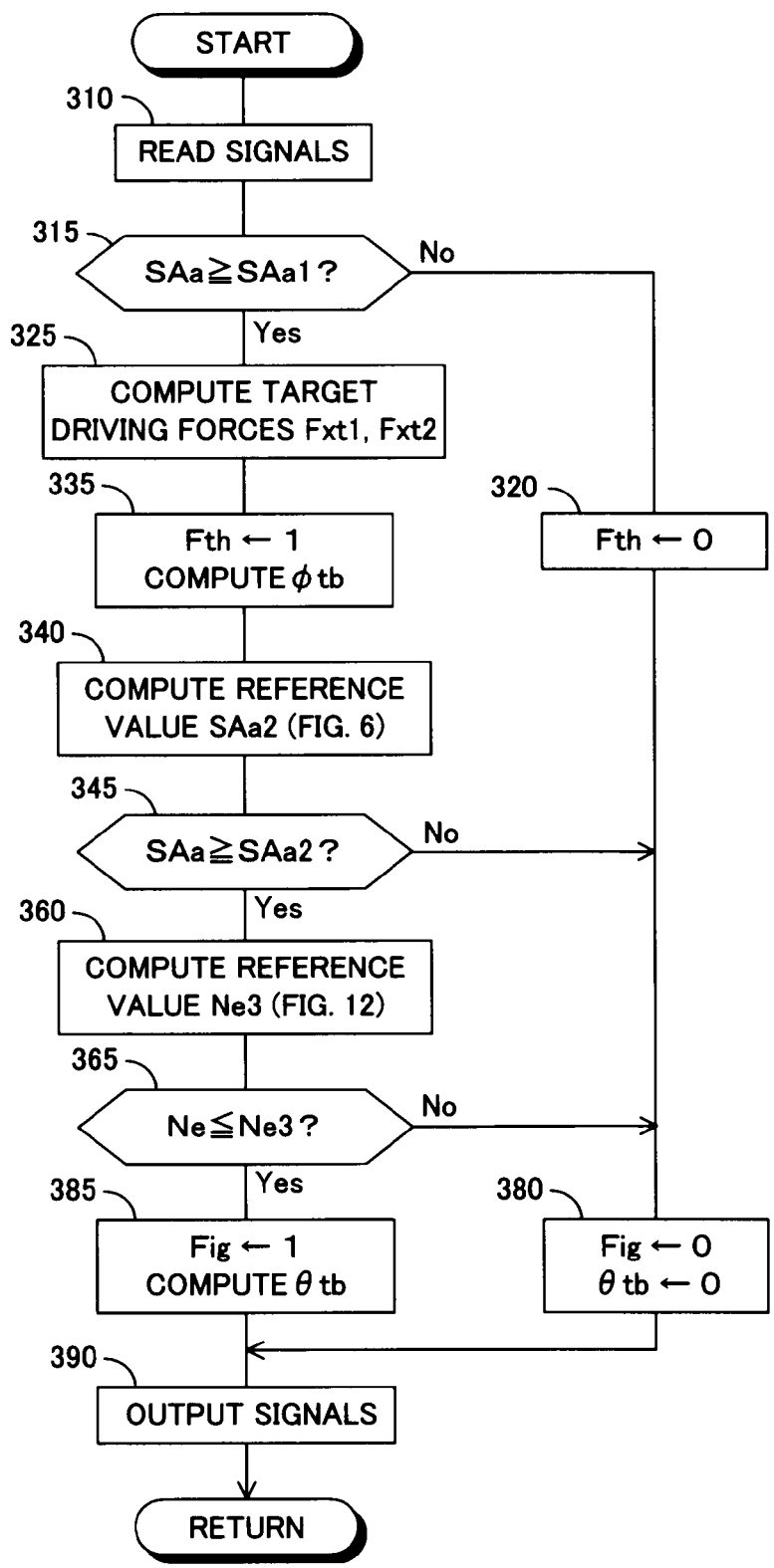
FIG. 11 is a flowchart showing a vehicular target driving force and ignition timing correction and control routine achieved by the braking and driving force controller in a third embodiment.

FIG. 11 is a flowchart showing the vehicular target driving force and ignition timing correction control routine, which is achieved by the braking and driving force controller 14 in a third embodiment of the vehicular driving force controller according to the present invention. In FIG. 11, the same steps as those shown in FIG. 3 are denoted by the same step numbers as in FIG. 3.

Also in the present embodiment, the individual steps of the vehicular target driving force computation routine and the throttle opening and ignition timing control routine are executed in the same manner as in the above-described first embodiment. Steps 310 to 345, and steps 380 to 390 of the vehicular target driving force and ignition timing correction control routine of the present embodiment are also executed in the same manner as in the above-described first embodiment. However, steps 360 and 365 are executed instead of steps 350 and 355 in the above-described first embodiment, respectively.

Figure 12:
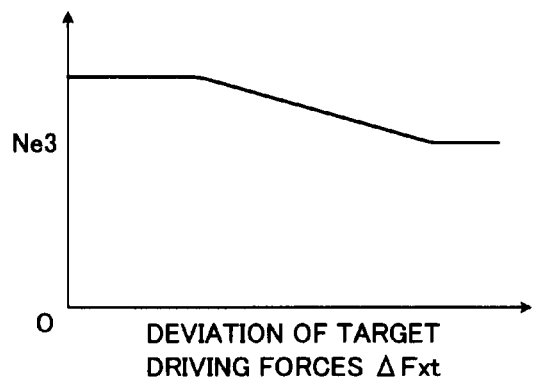
FIG. 12 is a graph showing a map for computing a reference value Ne3 on the basis of a deviation ΔFxt of the target driving forces.

Step 360 is executed if a positive determination is made in step 345. In step 360, the deviation ΔFxt between the target driving force Fxt (Fxta) of the vehicle computed just before the indicator value SAa becomes equal to or greater than the first reference value SAa1 and the target diving force (Fxtb) of the vehicle computed just after the indicator value SAa becomes equal to or greater than the first reference value SAa1 is computed. At the same time, in step 360, a reference value Ne3 for the engine rotational speed Ne is computed on the basis of the deviation ΔFxt of the target driving forces in accordance with a map shown in FIG. 12. In this case, the reference value Ne3 is computed so that the reference value Ne3 increases as the deviation ΔFxt of the target driving forces increases as shown in FIG. 12.

In step 365, a determination as to whether or not the engine rotational speed Ne is equal to or smaller than the reference value Ne3, that is, a determination as to whether or not the vehicle is in a situation where the control for reducing the output torque of the engine 16 through the ignition-timing delay control is allowed. If a positive determination is made, the control proceeds to step 385, and if a negative determination is made, the control proceeds to step 380.

As described above, according to the third embodiment as illustrated, as in the above-described first embodiment, it is possible to perform the control for reducing the output torque of the engine 16 through the ignition-timing delay control in addition to the control for reducing the output torque of the engine 16 through the throttle-opening reduction control, only in the state where the indicator value SAa is large and thus the degree of necessity of reducing the output torque of the engine 16 is very high.

In addition, according to the third embodiment as illustrated, the lower the engine rotational speed Ne and the lower the speed at which the engine output decreases through reduction of the throttle opening, the easier it is to obtain the reduction of the output torque of the engine 16 through the ignition-timing delay control. Accordingly, as in the above-described first and second embodiments, it is possible to effectively decrease the engine output by delaying the ignition timing, to thereby effectively decrease the driving force of the vehicle, even in the state where the speed at which the engine output decreases through reduction of the throttle opening is low.

In addition, according to the third embodiment as illustrated, delaying of the ignition timing is started if the engine rotational speed Ne is equal to or smaller than the reference value Ne3 in the state where the indicator value SAa is equal to or greater than the second reference value SAa2 and positive determinations are made in steps 315 and 345. Accordingly, it is possible to start delaying of the ignition timing earlier as compared with the cases of the first and second embodiments, to thereby achieve reduction of the engine output and the resultant reduction of the driving force of the vehicle at an earlier time.

Figure 13:
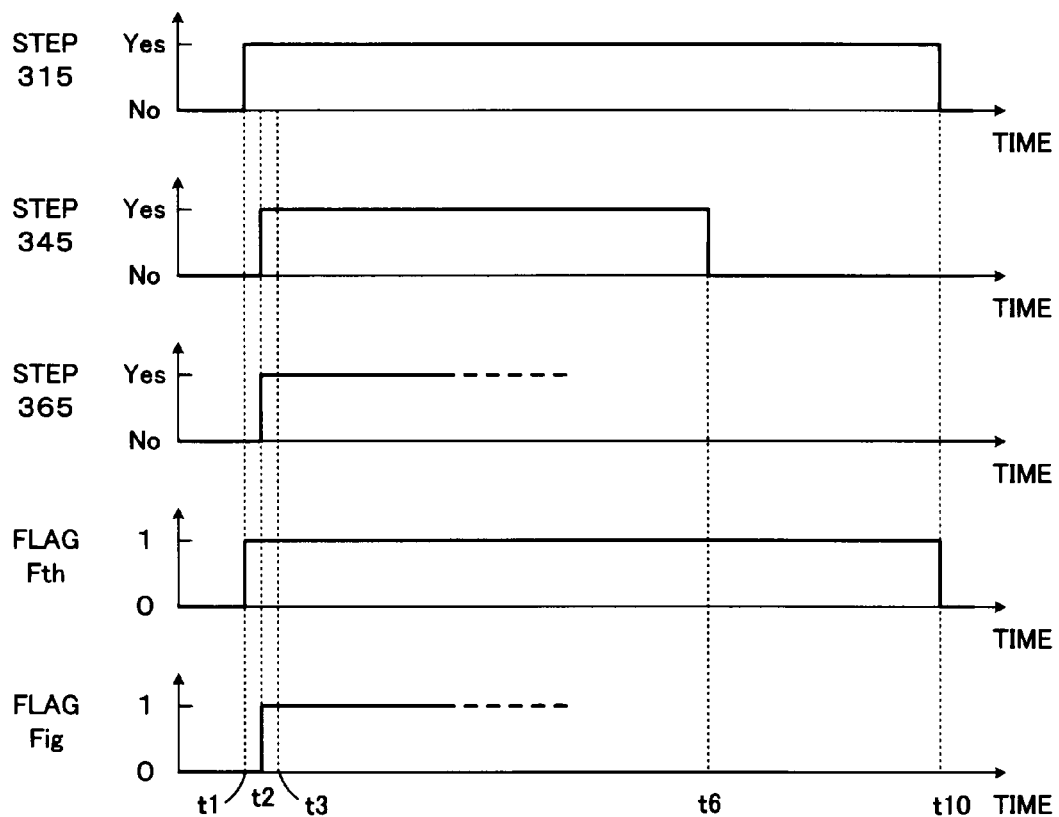
FIG. 13 is a time chart showing examples results of determinations in steps 315, 345, and 365 of FIG. 11 and example changes of the throttle opening reduction request flag Fth and the ignition timing delay request flag Fig.

For example, FIG. 13 shows an example of changes of the flags Fth and Fig in the case where the indicator value SAa changes in a manner similar to the case shown in FIG. 8, in the state where the engine rotational speed Ne is equal to or smaller than the reference value Ne3. As shown in FIG. 13, in the case of the third embodiment, in step 365, a positive determination is made at the time point t2, whereby the flag Fig is set to 1 at the time point t2. Accordingly, it is possible to start delaying of the ignition timing earlier than the cases of the above-described first and second embodiments in which the flag Fig is set to 1 at the time point t3. Although termination of delaying of the ignition timing is not illustrated in FIG. 13, the flag Fig is set to 0 if the indicator value SAa becomes smaller than the second reference value SAa2, or the engine rotational speed Ne becomes larger than the reference value Ne3, whereby delaying of the ignition timing is terminated.

Particularly, according to the illustrated third embodiment, as shown in FIG. 12, the reference value Ne3 for the engine rotational speed Ne is computed so that the reference value Ne3 increases as the deviation $\Delta Fxt$ of the target driving forces increases. Therefore, the greater the deviation $\Delta Fxt$ of the target driving forces and the greater the required reduction amount of the driving force of the vehicle, the easier it is to obtain the reduction of the output torque of the engine 16 through the ignition-timing delay control. Accordingly, it is possible to properly determine whether or not the ignition-timing delay control be needed in accordance with the required reduction amount of the driving force of the vehicle, as compared with the case where the reference value Ne3 is a fixed value.

Fourth Embodiment

Figure 14:
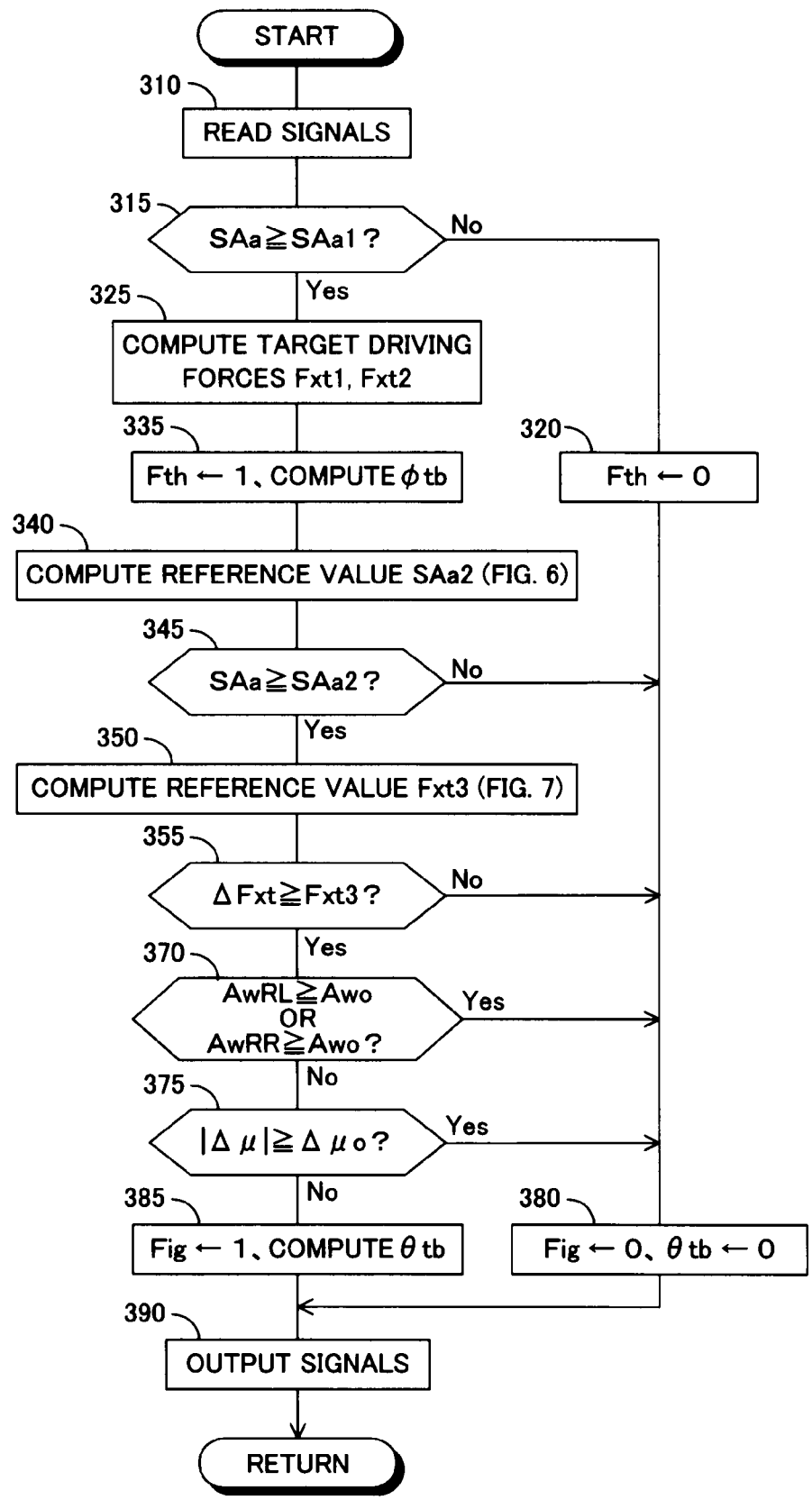
FIG. 14 is a flowchart showing a vehicular target driving force and ignition timing correction and control routine achieved by the braking and driving force controller in a fourth embodiment of the vehicular driving force controller according to the present invention, the fourth embodiment being a modification of the first embodiment.

FIG. 14 is a flowchart showing the vehicular target driving force and ignition timing correction control routine, which is achieved by the braking and driving force controller in a fourth embodiment of the vehicular driving force controller according to the present invention. The fourth embodiment is a modification of the first embodiment. In FIG. 14, the same steps as those shown in FIG. 3 are denoted by the same step numbers as in FIG. 3.

In the fourth embodiment, if the braking and driving force controller 14 determines that the deviation $\Delta Fxt$ of the target driving forces is equal to or greater than the deviation determination reference value Fxt3, the braking and driving force controller 14 computes amplitudes AwRL, AwRR of rotational vibration (hereinafter referred to as "rotational vibration amplitude") of the left and right rear wheels 32RL and 32RR on the basis of the wheel speeds VwRL, VwRR of the left and right rear wheels 32RL and 32RR, which are the drive wheels, and determines whether or not the rotational vibration amplitudes AwRL, AwRR are equal to or greater than a reference value Awo (positive constant) for rotational vibration determination (hereinafter referred to as "rotational vibration determination reference value Awo").

On the contrary, if the braking and driving force controller 14 determines that both the rotational vibration amplitudes AwRL, AwRR are less than the rotational vibration determination reference value Awo, it computes a difference $\Delta \mu$ of the road-surface friction coefficients $\mu A$ and $\mu B$, and determines whether or not the absolute value of the difference $\Delta \mu$ is equal to or greater than a reference value $\Delta \mu o$ (positive constant) for determining a split-$\mu$ road (hereinafter referred to as "split-$\mu$ road determination reference value $\Delta \mu o$").

The braking and driving force controller 14 computes the ignition timing delay correction amount $\theta tb$ on the basis of the deviation $\Delta Fxt$ of the target driving forces, sets the ignition timing delay request flag Fig to 1, and outputs to the engine controller 18 a signal representing the ignition timing delay correction amount $\theta tb$ and a signal indicating that the ignition timing delay request flag Fig is 1, if all of the following conditions are satisfied: the deviation $\Delta Fxt$ of the target driving forces is equal to or greater than the deviation determination reference value Fxt3; both the rotational vibration amplitudes AwRL, AwRR of the left and right rear wheels are less than the rotational vibration determination reference value Awo; and the absolute value of difference $\Delta \mu$ of the road-surface friction coefficients $\mu A$ and $\mu B$ is equal to or greater than the split-$\mu$ road determination reference value $\Delta \mu o$.

On the contrary, the braking and driving force controller 14 resets the ignition timing delay correction amount $\theta tb$ to 0, resets the ignition timing delay request flag Fig to 0, and outputs a signal indicating that the ignition timing delay request flag Fig is 0 to the engine controller 18, if either one of the following conditions is satisfied: the indicator value SAa is equal to or greater than the first reference value SAa1 but less than the second reference value SAa2; the indicator value SAa is equal to or greater than the second reference value SAa2 but the deviation $\Delta Fxt$ of the target driving forces is less than the deviation determination reference value Fxt3; the indicator value SAa is equal to or greater than the second reference value SAa2 and the deviation $\Delta Fxt$ of the target driving forces is equal to or greater than the deviation determination reference value Fxt3; and either of the rotational vibration amplitudes AwRL, AwRR of the left and right rear wheels is equal to or greater than the rotational vibration determination reference value Awo or the absolute value of the difference $\Delta \mu$ between the road-surface friction coefficients $\mu A$ and $\mu B$ is greater than the splits road determination reference value $\Delta \mu o$.

Next, the vehicular target driving force and ignition timing correction control routine which is achieved by the braking and driving force controller 14 in the fourth embodiment will be described, with reference to the flowchart shown in FIG. 14. Note that the individual steps of the vehicular target driving force computation routine and the throttle opening and ignition timing control routine are executed in the same manner as in the above-described first embodiment.

Steps 310 to 355 and steps 380 to 390 are executed in the same manner as in the above-described first embodiment. However, if a negative determination is made in step 355, the control proceeds to step 380, and if a positive determination is made in step 355, the control proceeds to step 370.

In step 370, the rotational vibration amplitudes AwRL, AwRR of the left and right rear wheels 32RL and 32RR are computed on the basis of the wheel speeds VwRL, VwRR of the left and right rear wheels 32RL and 32RR, and a determination is made as to whether at least one of the amplitudes AwRL and AwRR is equal to or greater than the rotational vibration determination reference value Awo, that is, as to whether or not rotational vibration is being generated at least one of the left and right rear wheels. If a positive determination is made, the control proceeds to step 380, and if a negative determination is made, the control proceeds to step 375.

In this case, the rotational vibration amplitudes AwRL, AwRR may be determined in an arbitrary manner known in the present technical field. For example, the rotational vibration amplitudes AwRL, AwRR may be determined by performing bandpass filtering on the wheel speeds VwRL, VwRR of the left and right rear wheels 32RL and 32RR to thereby extract a vibration component of the wheel speeds VwRL, VwRR, and computing the difference between the maximum and minimum values of wheel speed in a half-cycle vibration waveform of the vibration component.

In step 375, the difference $\Delta\mu$ of the road-surface friction coefficients $\mu A$ and $\mu B$ is computed, and a determination is made as to whether or not the absolute value of the difference $\Delta\mu$ is equal to or greater than the split-$\mu$ road determination reference value $\Delta\mu o$. In other words, a determination is made as to whether or not the difference between friction coefficients of the road surfaces which the left and right drive wheels face is large, and thus the road on which the vehicle travels is a split-$\mu$ road. If a negative determination is made, the control proceeds to step 385. If a positive determination is made, then in step 380, the ignition timing delay request flag Fig is reset to off, and the ignition timing delay correction amount θtb is set to 0, and subsequently, the control proceeds to step 390.

As described above, according to the fourth embodiment as illustrated, in step 370, a determination is made as to whether or not rotational vibration is generated in at least one of the left and right wheels on the basis of the wheel speeds VwRL, VwRR of the left and right rear wheels 32RL and 32RR, and then in step 375, a determination is made as to whether or not the road on which the vehicle travels is a so called split-$\mu$ road. As a result, a determination is made as to whether or not the vehicle is in the situation in which reduction of the output torque of the engine 16 through the ignition-timing delay control must be prohibited in order to prevent the rotational vibration statuses of the left and right rear wheels from becoming worse.

In the case where positive determinations are made in steps 330, 345, and 355 and negative determinations are made in steps 370 and 375, the control for reducing the output torque of the engine 16 through the throttle-opening reduction control and the control for reducing the output torque of the engine 16 through the ignition-timing delay control are executed by the steps 335, 385 of the present routine and the steps 440 and 450 of the throttle opening and ignition timing control routine shown in FIG. 4.

On the contrary, in the case where a negative determination is made in step 345 or 355 despite a positive determination in step 330, or in the case where a positive determination is made in step 370 or 375 despite positive determinations in 330, 345 and 355, only the control for reducing the output torque of the engine 16 through the throttle opening control is executed by step 380 of the present routine and by steps 440 and 455 of the throttle opening and ignition timing control routine shown in FIG. 4, and the ignition timing is controlled as usual without being delayed.

Therefore, according to the fourth embodiment, it is possible to perform the control for reducing the output torque of the engine 16 through the ignition-timing delay control in addition to the control for reducing the output torque of the engine 16 through the throttle opening control, only in the state where the indicator value SAa is large, the degree of necessity of reducing the output torque of the engine 16 is very high, and the rotational vibration statuses of the left and right rear wheels are unlikely to become worse even when the control for reducing the output torque of the engine 16 through the ignition-timing delay control is performed.

In other words, in the state where reduction of the driving force of the vehicle is needed but the degree of necessity thereof is not very high, the ignition timing is prevented from being delayed, to thereby prevent an increase in the temperature of exhaust gas of the engine and resultant deterioration of the exhaust gas purification catalyst 48. Further, in the state where the degree of necessity of reducing the driving force of the vehicle is very high, it is possible to reliably and effectively decrease the output of the engine by reducing the throttle opening and by delaying the ignition timing, to thereby reliably and effectively decrease the driving force of the vehicle. In addition, it is possible to prevent the ignition timing from being delayed, to thereby reliably prevent the rotational vibration statuses of the left and right rear wheels from becoming worse because of reduction of the output torque of the engine 16 through the ignition-timing delay control, in the case where the rotational vibration statuses of the left and right rear wheels are likely to worsen due to reduction of the output torque of the engine 16 through the ignition-timing delay control even if the degree of necessity of reducing the output torque of the engine 16 is very high.

Fifth Embodiment

Figure 15:
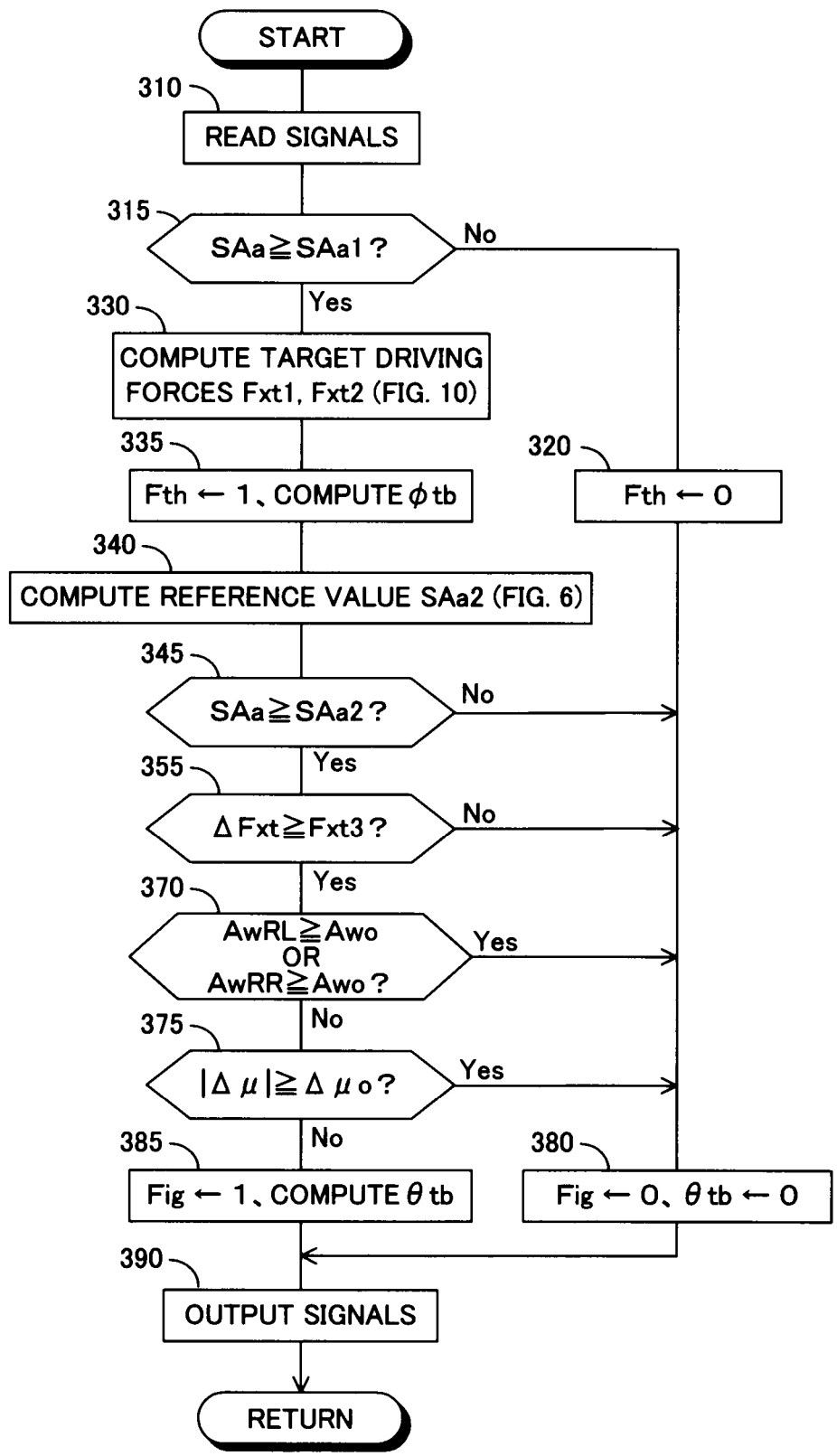
FIG. 15 is a flowchart showing a vehicular target driving force and ignition timing correction and control routine achieved by the braking and driving force controller in a fifth embodiment of the vehicular driving force controller according to the present invention, the fifth embodiment being a modification of the second embodiment.

FIG. 15 is a flowchart showing the vehicular target driving force and ignition timing correction control routine which is achieved by the braking and driving force controller in a fifth embodiment according to the present invention. The fifth embodiment is a modification of the second embodiment. In FIG. 15, the same steps as those shown in FIG. 9 are denoted by the same step numbers as in FIG. 9.

In the fifth embodiment, the individual steps of the vehicular target driving force computation routine and the throttle opening and ignition timing control routine are executed in the same manner as in the above-described first embodiment. Steps 310 to 355 and steps 380 and 390 are executed in the same manner as in the second embodiment. However, if a negative determination is made in step 355, the control proceeds to step 380, and if a positive determination is made in step 355, the control proceeds to step 370. Next, the steps 370 and 375 are executed in the same manner as in the above-described fourth embodiment.

Therefore, according to the fifth embodiment, it is possible to obtain an action and effects similar to those of the above-described fourth embodiment, in addition to an action and effects similar to those of the above-described second embodiment.

Sixth Embodiment

Figure 16:
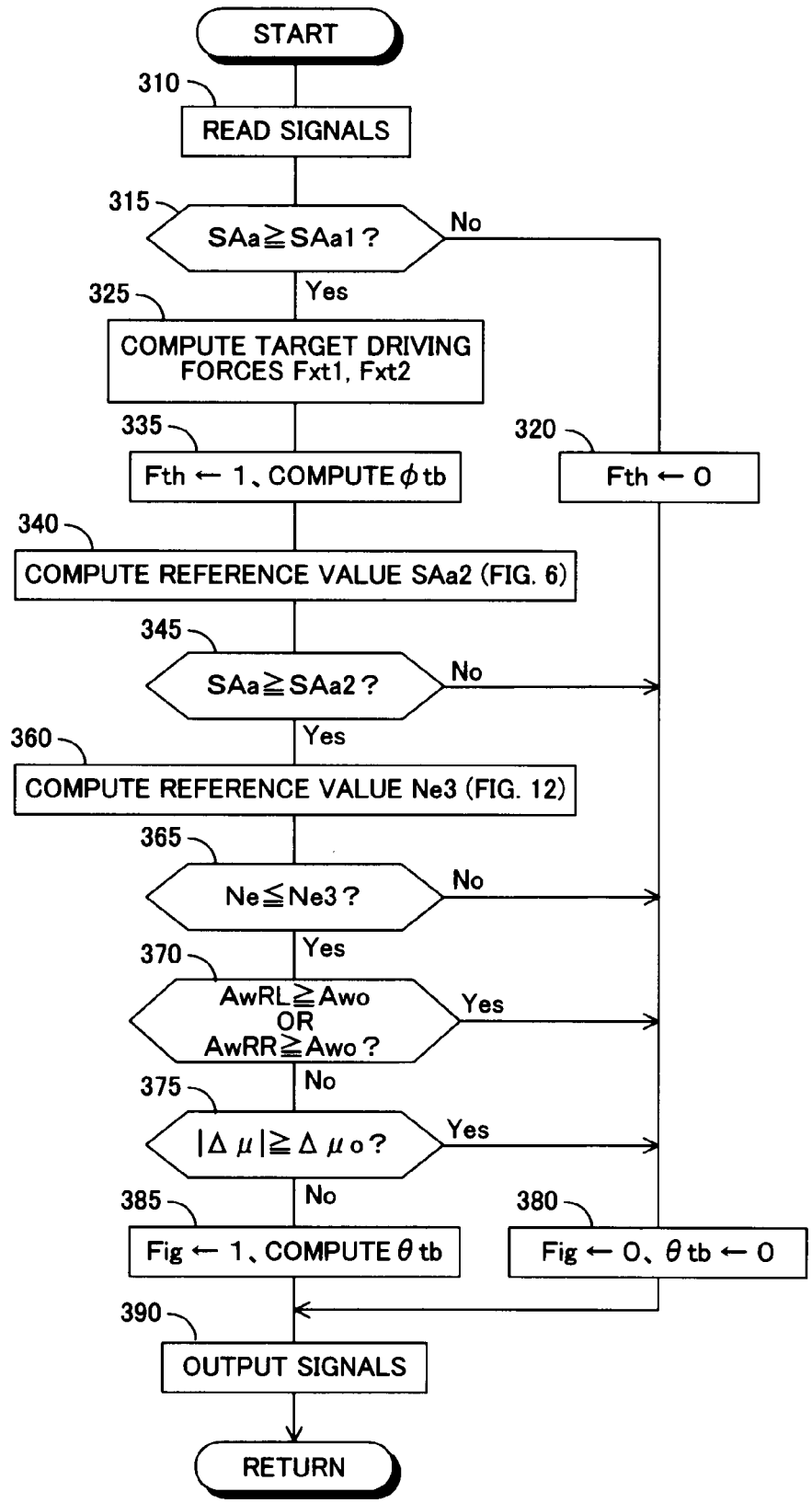
FIG. 16 is a flowchart showing a vehicular target driving force and ignition timing correction and control routine achieved by the braking and driving force controller in a sixth embodiment of the vehicular driving force controller according to the present invention, the sixth embodiment being a modification of the third embodiment.

FIG. 16 is a flowchart showing the vehicular target driving force and ignition timing correction control routine, which is achieved by the braking and driving force controller in a sixth embodiment according to the present invention. The sixth embodiment is a modification of the third embodiment. In FIG. 16, the same steps as those shown in FIG. 11 are denoted by the same step numbers as in FIG. 11.

Also in the sixth embodiment, the individual steps of the vehicular target driving force computation routine and the throttle opening and ignition timing control routine are executed in the same manner as in the above-described first embodiment. Steps 310 to 365 and steps 380 to 390 are executed in the same manner as in the above-described third embodiment. However, if a negative determination is made in step 365, the control proceeds to step 380, and if a positive determination is made in step 365, the control proceeds to step 370. Next, steps 370 and 375 are executed in the same manner as in the above-described fourth embodiment.

Therefore, according to the sixth embodiment, it is possible to obtain an action and effects similar to those of the above-described fourth embodiment, in addition to an action and effects similar to those of the above-described third embodiment.

In the meantime, according to each of the above-described embodiments, the control for reducing the output torque of the engine 16 through the ignition-timing delay control is not limited to the time when reduction control of the driving force of the vehicle is started, or the execution time thereof is not limited to a certain period of time after reduction control of the driving force of the vehicle is started. Therefore, it is possible to reliably and effectively decrease the output torque of the engine 16 through the throttle opening control and the ignition-timing delay control, and thus to reliably and effectively reduce drive slippage of the drive wheels, even if the drive slippages of the drive wheels become excessively large again after the control for reducing the output torque of the engine 16 through the throttle opening control and the ignition-timing delay control is performed.

Further, in each of the above-described embodiments, in the case where the indicator value SAa is equal to or greater than the second reference value SAa2, the engine output is decreased through both reduction of the throttle opening and delaying of the ignition timing, whereby the driving force of the vehicle is efficiently decreased. Accordingly, the indicator value SAa quickly drops, and the delaying of the ignition timing is not continued for an excessively long period of time.

Further, according to each of the above-described embodiments, in step 340, as shown in FIG. 6, the second reference value SAa2 is variably set in accordance with the vehicle speed Vb, the lateral acceleration Gy of the vehicle, the road surface coefficient of friction μ, so that the second reference value SAa2 decreases as the vehicle speed Vb increases, the absolute value of the lateral acceleration Gy of the vehicle increases, and the road surface coefficient of friction μ decreases. Accordingly, as compared with the case where the second reference value SAa2 is a fixed value, it is possible to determine properly whether or not the ignition-timing delay control is needed in accordance with the vehicle speed Vb, the lateral acceleration Gy of the vehicle, and the road-surface coefficient of friction μ, in other words, in accordance with the likeliness that the traveling motion of the vehicle becomes unstable due to an excessively large driving force of the vehicle.

Further, according to each of the above-described embodiments, in step 340, as shown in FIG. 6, the second reference value SAa2 is variably set in accordance with the engine rotational speed Ne, so that the second reference value SAa2 decreases as the engine rotational speed Ne decreases. Therefore, as compared with the case where the second reference value SAa2 is a fixed value irrespective of the engine rotational speed Ne being high or low, it is possible to reliably and quickly decrease the engine output, even in the state where the engine rotational speed Ne is low and thus the engine output cannot be quickly reduced through reduction of the throttle opening. On the contrary, in the state where the engine rotational speed Ne is relatively high and thus the engine output can be decreased relatively quickly through reduction of the throttle opening, it is possible to prevent the ignition timing from being unnecessarily delayed, to thereby reliably reduce the possibility that the temperature of exhaust gas of the engine increases, which causes deterioration of the exhaust gas purification catalyst.

Further, according to each of the above-described embodiments, in step 325 or 330, the target driving force Fxt1 to be achieved through the throttle-opening reduction control and the target driving force Fxt2 to be achieved through the ignition-timing delay control are computed. In the case where the throttle opening is to be reduced, then in step 440, the opening of the throttle value 36 is controlled, so that the opening of the throttle valve 36 coincides with the target throttle opening φtb corresponding to the target driving force Fxt1. Therefore, it is possible to reliably prevent the opening of the throttle valve 36 from being reduced excessively fast or being reduced excessively slowly.

Similarly, in the case where the ignition timing is to be delayed, in step 450, the ignition timing is controlled so that the ignition timing coincides with the corrected ignition timing corrected or delayed by the delay correction amount corresponding to the deviation ΔFxt between the target driving force Fxt1 to be achieved through the throttle-opening reduction control and the target driving force Fxt2 to be achieved through the throttle-opening reduction control and the ignition-timing delay control. Therefore, it is possible to reliably prevent the opening of the throttle valve 36 from being reduced excessively fast or being reduced excessively slowly.

Particularly, according to the above-described fourth to sixth embodiments, in step 370, a determination is made as to whether or not rotational vibration is generated in at least one of the left and right wheels on the basis of the wheel speeds VwRL, VwRR of the left and right rear wheels, and then in step 375, a determination is made as to whether or not the driving road is a so called split-μ road, whereby a determination is made as to whether or not the rotational vibration statuses of the left and right rear wheels are likely to worsen. Accordingly, as compared with the case where only one of the determinations in step 370 or 375 is made, it is possible to reliably and effectively prevent the rotational vibration statuses of the left and right rear wheels from becoming worse through reduction of the output torque of the engine 16 through the ignition-timing delay control.

In the above, specific embodiments of the present invention have been described in detail. However, the present invention is not limited to the above-described embodiments, and it will be apparent to those skilled in the art that other various embodiments are possible within the scope of the present invention.

For example, in each of the above-described embodiments, engine output reduction means for reducing the output of the engine reduces the output of the engine by delaying the ignition timing of the engine. However, the engine output reduction means may reduce the output of the engine through reduction of the amount of fuel supplied to the engine (hereinafter referred to "fuel supply amount"), or may reduce the output of the engine through both delaying of the ignition timing and reduction of the fuel supply amount.

Particularly, in the case where the engine output reduction means reduces the output of the engine through reduction of the amount of fuel supplied to the engine, the target driving force Fxt2 in each of the above-described embodiments is computed as the target driving force to be achieved through the throttle-opening reduction control and the fuel supply amount reduction control, and the fuel supply reduction amount is controlled on the basis of the deviation ΔFxt between the target driving force Fxt1 and the target driving force Fxt2.

Similarly, in the case where the engine output reduction means reduces the output of the engine through both delaying of the ignition timing and reduction of the fuel supply amount, the target driving force Fxt2 in each of the above-described embodiments is computed as the target driving force to be achieved through the throttle-opening reduction control, the ignition delay control, and the fuel supply amount reduction control, and the ignition timing delay correction amount and the fuel supply reduction amount are controlled in accordance with the deviation ΔFxt between the target driving force Fxt1 and the target driving force Fxt2.

Further, in each of the above-described embodiments, determinations of steps 215, 230 and 240 are performed, and the target driving force Fxt of the vehicle required in order to reduce the likelihood that the drive slippages of the left and right rear wheels become excessively large, in the case where the traveling behavior of the vehicle has become worse, in the case where the indicator value SAa becomes equal to or greater than the first reference value SAa1, and in the case where the road surface coefficient of friction μ is equal to or less than the reference value μo. However, either one of the determinations in steps 215, 230 or 230 may be omitted, or the embodiments may be modified such that the determination as to whether the driving force of the vehicle need be reduced is made on the basis of the other pieces of traveling information of the vehicle.

Further, in each of the above-described embodiments, the reference value SAa1 for the determination in step 230 is identical with the reference value SAa1 for the determination in step 315. However, these reference values for the determinations may be different from each other. In addition, the reference values SAa1 for the determinations in steps 230 and 315 are fixed. However, the embodiments may be modified such that at least one of the reference values for the determinations in steps 230 and 315 is variably set in accordance with the engine rotational speed Ne so that the reference values decrease as the engine rotational speed Ne decreases.

Further, in each of the above-described embodiments, the target driving force Fxt of the vehicle is computed by the braking and driving force controller 14, separately from the basic target driving force Fxt computed by the engine controller 18, and the target gear position St of the automatic transmission 24 and the target throttle opening φtb are computed on the basis of the basic target driving force Fxt. However, in the case where the driving force of the vehicle need not be reduced, the embodiments may be modified such that, as is the case with ordinary vehicles, the throttle opening φ is controlled on the basis of the accelerator opening Ap, etc., and the gear position of the automatic transmission 24 is controlled on the basis of the throttle opening φ and the vehicle speed.

Further, in each of the above-described embodiments, in the case where the indicator value SAa is equal to or greater than the first reference value SAa1, the target driving force Fxt1 to be achieved through the throttle-opening reduction control is computed, the target throttle opening φtb is computed on the basis of the target driving force Fxt1, and the throttle opening φ is controlled on the basis of the target throttle opening φtb. However, the embodiments may be modified such that the throttle opening φ is corrected to be reduced on the basis of, for example, the indicator value SAa.

Similarly, in the case where the indicator value SAa is equal to or greater than the second reference value SAa1, the target driving force Fxt2 to be achieved through the throttle-opening reduction control and the ignition-timing delay control is also computed, the ignition timing delay correction amount θtb is computed on the basis of the deviation ΔFxt between the target driving force Fxt1 and the target driving force Fxt2, and the ignition timing is delayed on the basis of the ignition timing delay correction amount θtb. However, the embodiments may be modified such that the ignition timing is also delayed, for example, on the basis of the indicator value SAa.

Further, in each of the above-described embodiments, a determination in step 355 or 365 is made in addition to the determination in step 345, and the ignition timing is delayed if a positive determination is made in these steps. However, the embodiments may be modified such that the determination in step 355 or 365 is omitted, and the ignition timing is delayed if a positive determination is made in step 345.

Further, in each of the above-described embodiments, in step 340, the second reference value SAa2 for the indicator value SAa is computed on the basis of the vehicle speed Vb, the lateral acceleration Gy of the vehicle, and the road surface coefficient of friction μ, in accordance with the map shown in FIG. 6. However, any of the parameters among the vehicle speed Vb, the lateral acceleration Gy of the vehicle, and the road surface coefficient of friction μ may be omitted, or the second reference value SAa2 may be set to a fixed value.

Further, in the above-described first and fourth embodiments, in step 350, the deviation determination reference value Fxt3 is variably set in accordance with the engine rotational speed Ne, so that the deviation determination reference value Fxt3 decreases as the engine rotational speed Ne decreases. However, step 350 may be omitted and the deviation determination reference value Fxt3 may be set to a fixed value.

Similarly, in the above-described third and sixth embodiments, in step 360, the reference value Ne3 is variably set in accordance with the deviation ΔFxt of the target driving force, so that the reference value Ne3 increases as the deviation ΔFxt of the target driving forces increases. However, step 360 may be omitted and the reference value Fxt3 may be set to a fixed value.

In addition, in the above-described fourth to sixth embodiments, in step 370, a determination is made as to whether or not rotational vibration is generated in at least one of the left and right wheels on the basis of the wheel speeds VwRL, VwRR of the left and right rear wheels, and then in step 375, a determination is made as to whether or not the traveling road is a so called split-μ road. However, either one of the determinations in step 370 and 375 may be omitted.

In addition, in the above-described fourth to sixth embodiments, the determination reference value Awo in step 370 and the determination reference value Δμo in step 375 are both constant values. However, since the likelihood of a rotational vibration being generated in the drive wheels because of reduction of the engine output through delaying of the ignition timing increases as the road-surface friction coefficient decreases, the embodiments may be modified such that the reference value Awo is variably set in accordance with the road surface coefficient of friction so that the reference value Awo becomes smaller when the road surface coefficient of friction is low, as compared with the case where the road surface coefficient of friction is large. Alternatively, the embodiments may be modified such that the reference value Δμo is variably set in accordance with a lower value of the road-surface friction coefficients μA and μB so that the reference value Δμo becomes smaller when the lower value of them is low, as compared with the case where the lower value of them is high.

Further, each of the above-described embodiments is applied to a rear-wheel drive vehicle. However, the present invention may also be applied to a front-wheel drive vehicle or a four-wheel drive vehicle. In addition, the automatic transmission 24 is a multi-stage automatic transmission including the torque converter 20. However, the transmission of a vehicle to which the present invention is applied may be a continuously variable transmission.

The invention claimed is:
1. A driving force controller for a vehicle comprising:
throttle-opening control means for controlling a throttle opening of an engine on the basis of at least an amount of drive operation by a driver;

engine-output reduction means for reducing an output of the engine through delaying of ignition timing of the engine or reduction of an amount of fuel supplied to the engine;

driving-force reduction control means for determining a degree of necessity of reducing a driving force of the vehicle on the basis of travel conditions of the vehicle and for reducing the output of the engine by controlling at least the throttle-opening control means based on the degree of necessity, wherein when the degree of necessity is equal to or higher than a first reference value, the driving-force reduction control means reduces the throttle opening controlled by the throttle-opening control means, and, when the degree of necessity is equal to or higher than a second reference value greater than the first reference value, the driving-force reduction control means reduces the output of the engine by the engine-output reduction means as well as reducing the throttle opening controlled by the throttle-opening control means;

means for computing a first target driving force of the vehicle on the basis of the amount of drive operation by the driver and the travel condition of the vehicle, wherein the driving-force reduction control means calculates, on the basis of two values of the first target driving force computed before and after a point in time when the degree of necessity becomes equal to or greater than the first reference value, a second target driving force which decreases more slowly than a decrease of the first target driving force between the two values and which is to be achieved through control of the throttle-opening control means and a third target driving force which decreases more slowly than the decrease of the first target driving force between the two values and faster than the second target driving force and which is to be achieved through control of the throttle-opening control means and the engine-output reduction means; and the driving-force reduction control means reduces the output of the engine by the engine-output reduction means when the degree of necessity is equal to or greater than the second reference value and a deviation between the second target driving force and the third target driving force is equal to or greater than a deviation determination reference value.

2. A driving force controller for a vehicle according to claim 1, wherein the driving-force reduction means comprises:

rotational-vibration-state determination means for determining whether or not a rotational vibration state of the vehicle drive wheels possibly becomes worse due to reduction of the output of the engine by the engine output reduction means; and prohibition means for prohibiting the reduction of the output of the engine by the engine output reduction means when the rotational-vibration-state determination means determines that the rotational vibration state of the drive wheels possibly becomes worse, despite the degree of necessity being equal to or greater than the second reference value.

3. A driving force controller for a vehicle according to claim 2, wherein the rotational-vibration-state determination means includes means for detecting a rotational vibration of the drive wheels, and, when the degree of the rotational vibration of the drive wheels is equal to or greater than a reference value for rotational vibration determination, the rotational-vibration-state determination means determines that the rotational vibration state of the drive wheels possibly becomes worse.

4. A driving force controller for a vehicle according to claim 2, wherein the rotational-vibration-state determination means includes means for detecting friction coefficients of road surfaces which left and right drive wheels face, and, when the difference between the friction coefficients of the road surfaces which the left and right drive wheels face is equal to or greater than a reference value for road determination, the rotational-vibration-state determination means determines that the rotational vibration state of the drive wheels possibly becomes worse.

5. A driving force controller for a vehicle according to claim 2, further comprising:

means for computing a first target driving force of the vehicle on the basis of the amount of drive operation by a driver and the travel condition of the vehicle, wherein the driving-force reduction control means calculates, on the basis of two values of the first target driving force computed before and after a point in time when the degree of necessity becomes equal to or greater than the first reference value, a second target driving force which decreases more slowly than a decrease of the first target driving force between the two values and which is to be achieved through control of the throttle-opening control means and a third target driving force which decreases more slowly than the decrease of the first target driving force between the two values and faster than the second target driving force and which is to be achieved through control of the throttle-opening control means and the engine-output reduction means; and the driving-force reduction control means reduces the output of the engine by the engine-output reduction means when the degree of necessity is equal to or greater than the second reference value and a deviation between the second target driving force and the third target driving force is equal to or greater than a deviation determination reference value, and wherein the prohibition means is configured such that, even when the degree of necessity is equal to or greater than the second reference value and the deviation between the second target driving force and the third target driving force is equal to or greater than the deviation determination reference value, the prohibition means prohibits the reduction of the output of the engine by the engine output reduction means when the rotational-vibration-state determination means determines that the rotational vibration state of the drive wheels possibly becomes worse.

6. A driving force controller for a vehicle according to claim 1, wherein the deviation determination reference value is variably set in accordance with rotational speed of the engine such that, when the rotational speed of the engine is less than or equal to a reference value for engine rotational speed determination, the deviation determination reference value becomes a first value, and the deviation determination reference value becomes a second value when the rotational speed of the engine is greater than the reference value for engine rotational speed determination, wherein the first value is smaller than the second value.

7. A driving force controller for a vehicle according to claim 1, wherein a rate of decrease of the second target driving force to be achieved through control of the throttle-opening control means is variably set in accordance with the rotational speed of the engine such that, when the rotational speed of the engine is less than or equal to a reference value for engine rotational speed determination, the rate becomes a first value, and the rate becomes a second value when the rotational speed of the engine is greater than the reference value for engine rotational speed determination, wherein the first value is smaller than the second value.

8. A driving force controller for a vehicle according to claim 1, wherein the throttle-opening control means controls the throttle opening on the basis of the second target driving force to be achieved through control of the throttle-opening control means.

9. A driving force controller for a vehicle according to claim 1, wherein the engine output reduction means reduces the output of the engine on the basis of the deviation between the second target driving force to be achieved through control of the throttle-opening control means and the third target driving force to be achieved through control of the throttle-opening control means and the engine-output reduction means.

10. A driving force controller for a vehicle according to claim 1, wherein, when the degree of necessity is equal to or greater than the second reference value and the rotational speed of the engine is equal to or less than a reference value for engine rotational speed determination, the driving-force reduction control means reduces the output of the engine by the engine output reduction means.

11. A driving force controller for a vehicle according to claim 2, wherein the driving-force reduction control means is configured to reduce the output of the engine by the engine output reduction means when the degree of necessity is equal to or greater than the second reference value and the rotational speed of the engine is equal to or less than a reference value for engine rotational speed determination, wherein the prohibition means is configured such that, even when the degree of necessity is equal to or greater than the second reference value and the rotational speed of the engine is equal to or less than the reference value for engine rotational speed determination, the prohibition means prohibits the reduction of the output of the engine by the engine output reduction means when the rotational-vibration-state determination means determines that the rotational vibration state of the drive wheels possibly becomes worse.

12. A driving force controller for a vehicle according to claim 10, further comprising:

means for computing a target driving force of the vehicle on the basis of the amount of drive operation by the driver and the travel condition of the vehicle, wherein a difference between two values of the first target driving force computed before and after a point in time when the degree of necessity becomes equal to or greater than the first reference value is used as a reference target driving force difference, and the reference value for engine rotational speed determination is variably set in accordance with the reference target driving force difference such that, when the reference target driving force difference is a first value, the reference value for engine rotational speed determination increases as compared with the case where the reference target driving force difference is a second value, wherein the first value is larger than the second value.

13. A driving force controller for a vehicle according to claim 1, wherein the second reference value is variably set on the basis of at least one of friction properties of road surface, lateral acceleration of the vehicle, and vehicle speed.

14. A driving force controller for a vehicle according to claim 1, wherein the second reference value is variably set in accordance with a rotational speed of the engine such that, when the rotational speed of the engine is less than or equal to a reference value for engine rotational speed determination, the second reference value decreases as compared with the case where the rotational speed of the engine is greater than the reference value for engine rotational speed determination.

15. A driving force controller for a vehicle according to claim 1, wherein the driving-force reduction control means determines the degree of necessity on the basis of at least one of a demanded reduction amount of the target driving force of the vehicle based on a travel motion condition of the vehicle, a degree of drive slippage of drive wheels of the vehicle, and a friction coefficient of road surface.

16. A driving force controller for a vehicle according to claim 5, wherein the deviation determination reference value is variably set in accordance with rotational speed of the engine such that, when the rotational speed of the engine is less than or equal to a reference value for engine rotational speed determination, the deviation determination reference value becomes a first value, and the deviation determination reference value becomes a second value when the rotational speed of the engine is greater than the reference value for engine rotational speed determination, wherein the first value is smaller than the second value.

17. A driving force controller for a vehicle according to claim 5, wherein a rate of decrease of the second target driving force to be achieved through control of the throttle-opening control means is variably set in accordance with the rotational speed of the engine such that, when the rotational speed of the engine is less than or equal to a reference value for engine rotational speed determination, the rate becomes a first value, and the rate becomes a second value when the rotational speed of the engine is greater than the reference value for engine rotational speed determination, wherein the first value is smaller than the second value.

18. A driving force controller for a vehicle according to claim 5, wherein the throttle-opening control means controls the throttle opening on the basis of the second target driving force to be achieved through control of the throttle-opening control means.

19. A driving force controller for a vehicle according to claim 5, wherein the engine output reduction means reduces the output of the engine on the basis of the deviation between the second target driving force to be achieved through control of the throttle-opening control means and the third target driving force to be achieved through control of the throttle-opening control means and the engine-output reduction means.

* * * * *